(12) United States Patent
      Kawano

(10) Patent No.:  US 12,684,249 B2
(45) Date of Patent:       Jul. 14, 2026

(54) ILLUMINATION DEVICE AND INSPECTION DEVICE

(71) Applicant: NICHIA CORPORATION, Anan (JP)

(72) Inventor: Yohei Kawano, Tokushima (JP)

(73) Assignee: NICHIA CORPORATION, Anan (JP)

( * ) Notice: Subject to any disclaimer, the term of this patent is extended or adjusted under 35 U.S.C. 154(b) by 250 days.

(21) Appl. No.: 18/666,816

(22) Filed: May 17, 2024

(65) Prior Publication Data

US 2024/0397208 A1      Nov. 28, 2024

(30) Foreign Application Priority Data

May 24, 2023    (JP) ................................. 2023-085432

(51) Int. Cl.
     *H04N 23/74*          (2023.01)
     *B23Q 17/24*          (2006.01)
     *F21V 7/04*           (2006.01)
     *F21V 7/09*           (2006.01)
     *F21Y 105/18*         (2016.01)
     *H04N 23/56*          (2023.01)

(52) U.S. Cl.
     CPC ......... *H04N 23/74* (2023.01); *B23Q 17/2404* (2013.01); *F21V 7/04* (2013.01); *F21V 7/09* (2013.01); *H04N 23/56* (2023.01); *F21Y 2105/18* (2016.08)

(58) Field of Classification Search
     CPC .......... H04N 23/74; H04N 23/56; F21V 7/04; F21V 7/045; F21V 7/046; F21V 7/06; F21V 7/09; F21Y 2105/18; B23Q 17/2404

USPC ..................................................... 362/33, 216
See application file for complete search history.

(56) References Cited

U.S. PATENT DOCUMENTS

| | | | |
|---|---|---|---|
| 2006/0228017 A1 | 10/2006 | Kuramasu et al. | |
| 2009/0168446 A1* | 7/2009 | Okada ..................... | F21S 43/15 |
| | | | 362/516 |
| 2010/0327745 A1 | 12/2010 | Dassanayake et al. | |
| 2012/0069339 A1 | 3/2012 | Toyoda | |
| 2013/0077332 A1 | 3/2013 | Hessling et al. | |
| 2019/0258837 A1 | 8/2019 | Schneider et al. | |

FOREIGN PATENT DOCUMENTS

| | | |
|---|---|---|
| CN | 105757553 | 7/2016 |
| JP | 2003-004641 | 1/2003 |
| JP | JF2003-152400 | 5/2003 |

(Continued)

*Primary Examiner* — Laura K Tso
(74) *Attorney, Agent, or Firm* — MORI & WARD, LLP

(57) ABSTRACT

An illumination device includes a light source module and a light reflective member. The light source module includes a substrate having a first surface and a plurality of light sources thereon, each light source emitting light including first light and second light having luminance lower than the first light. The light reflective member is disposed on a first surface side of the substrate and has a reflective surface. The reflective surface includes a first reflective surface to reflect the first light and a second reflective surface to reflect the second light. The second reflective surface is closer to the substrate than the first reflective surface is. Of the light emitted from one light source of the light sources, the first light reflected by the first reflective surface and the second light reflected by the second reflective surface are condensed at a condensing point located on the first surface side.

20 Claims, 25 Drawing Sheets

(56)                References Cited

FOREIGN PATENT DOCUMENTS

| | | |
|---|---|---|
| JP | 2005-003510 | 1/2005 |
| JP | 2005-283817 | 10/2005 |
| JP | 2012-063245 | 3/2012 |
| JP | 2012-531712 | 12/2012 |
| JP | 2014-006237 | 1/2014 |
| JP | 2015-191998 | 11/2015 |
| JP | 2017-133984 | 8/2017 |
| JP | 2019-194563 | 11/2019 |
| JP | 2022-029896 | 2/2022 |

* cited by examiner

ILLUMINATION DEVICE AND INSPECTION DEVICE

CROSS-REFERENCE TO RELATED APPLICATIONS

The present application claims priority under 35 U.S.C. § 119 to Japanese Patent Application No. 2023-085432, filed May 24, 2023, the contents of which is hereby incorporated by reference in its entirety.

1. Technical Field

Embodiments relate to an illumination device and an inspection device.

2. Description of Related Art

There is an illumination device for observing, for example, a surface shape of an irradiation target by irradiating the irradiation target with light. In addition, there is an inspection device that captures an image of an inspection target by irradiating the inspection target with light using such an illumination device (for example, see Japanese Patent Publication No. 2012-63245).

Regarding such an illumination device and an inspection device, in order to observe a clear image, there is a demand for irradiating an irradiation target with light with reduced luminance unevenness.

SUMMARY

Embodiment of the present invention advantageously provide an illumination device and an inspection device where luminance unevenness of light with which an irradiation target is irradiated is reduced.

According to an aspect of the present invention, an illumination device includes: a light source module including a substrate having a first surface and a plurality of light sources arranged on the first surface, each of the plurality of light sources being configured to emit light including first light and second light having luminance lower than luminance of the first light; and a light reflective member having a reflective surface configured to reflect the light emitted from each of the plurality of light sources, the reflective surface being disposed on a first surface side of the substrate. The reflective surface includes a first reflective surface configured to reflect the first light and a second reflective surface configured to reflect the second light. The second reflective surface is located closer to the substrate than the first reflective surface is. Of the light emitted from one light source of the plurality of light sources, the first light reflected by the first reflective surface and the second light reflected by the second reflective surface are condensed at a condensing point located on the first surface side of the substrate.

According to an aspect of the present invention, an illumination device includes a plurality of intermediate members each including: a light source module including a substrate having a first surface, and a plurality of light sources configured to emit, on the first surface, light including first light and second light having luminance lower than luminance of the first light; and a light reflective member having a reflective surface configured to reflect light emitted from each of the plurality of light sources. In each of the plurality of intermediate members, the reflective surface includes a first reflective surface configured to reflect the first light and a second reflective surface configured to reflect the second light. The second reflective surface is located closer to the substrate than the first reflective surface is. Of the light emitted from one light source of the plurality of light sources, the first light reflected by the first reflective surface and the second light reflected by the second reflective surface are condensed at a condensing point. The plurality of light sources are disposed in an arc shape. A plurality of the lights emitted from the plurality of light sources are reflected by the reflective surface and travel toward an irradiation target. The plurality of intermediate members are connected to each other.

According to an aspect of the present invention, an inspection device includes: an illumination device; and an imaging device disposed apart from the illumination device and configured to image an inspection target irradiated with light emitted from the illumination device. The illumination device includes: a light source module including a substrate having a first surface and a plurality of light sources arranged on the first surface, each of the plurality of light sources being configured to emit light including first light and second light having luminance lower than luminance of the first light; and a light reflective member configured to reflect the light emitted from each of the plurality of light sources. The reflective surface includes a first reflective surface configured to reflect the first light and a second reflective surface configured to reflect the second light. The second reflective surface is located closer to the substrate than the first reflective surface is.

According to embodiments of the present invention, it is possible to provide an illumination device and an inspection device where luminance unevenness of light with which an irradiation target is irradiated is reduced.

BRIEF DESCRIPTION OF THE DRAWINGS

A more complete appreciation of embodiments of the invention and many of the attendant advantages thereof will be readily obtained by reference to the following detailed description when considered in connection with the accompanying drawings.

DETAILED DESCRIPTION

Description of Embodiments

Figure 1:
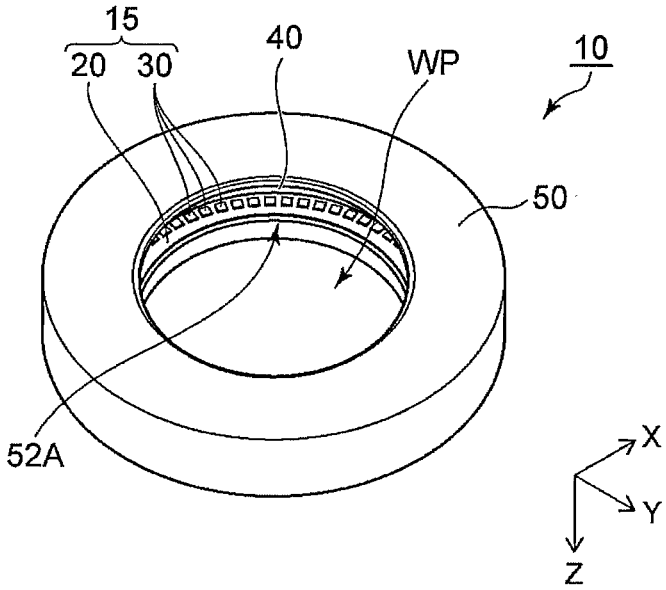
FIG. 1 is a schematic perspective view illustrating an illumination device according to a first embodiment.

Embodiments of the present invention will be described below with reference to the drawings.

Note that the drawings are schematic or conceptual, and the relationships between thicknesses and widths of portions, the proportions of sizes between portions, and the like are not necessarily the same as the actual values thereof. Furthermore, the dimensions and the proportions may be illustrated differently between the drawings, even in a case in which the same portion is illustrated.

Note that, in the description and the drawings, elements similar to those described in relation to a drawing herein are denoted using like reference characters, and a detailed description is omitted as appropriate.

First Embodiment

FIG. 1 is a schematic perspective view illustrating an illumination device according to a first embodiment.

Figure 2:
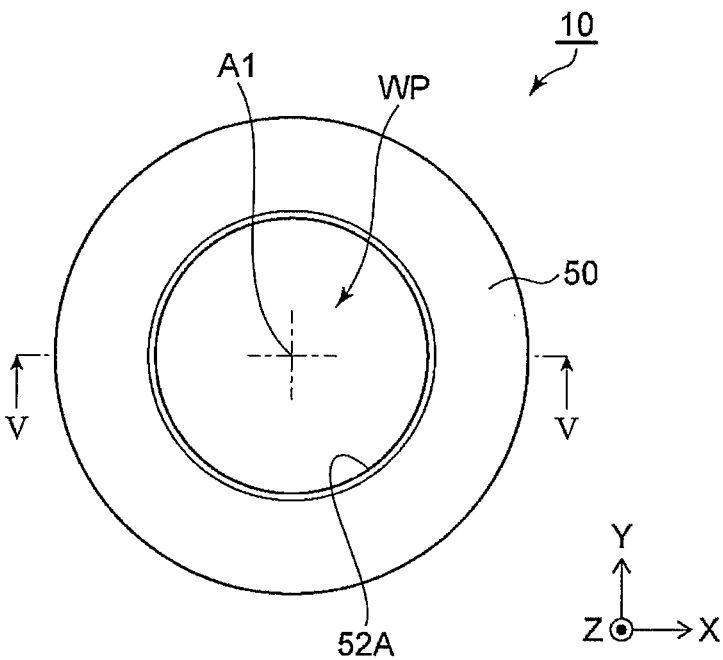
FIG. 2 is a schematic top view illustrating the illumination device according to the first embodiment.

FIG. 2 is a schematic top view illustrating the illumination device according to the first embodiment.

As illustrated in FIG. 1, an illumination device 10 according to the present embodiment includes a light source module 15 and a light reflective member 40. The light source module 15 includes a substrate 20 and a plurality of light sources 30. The plurality of light sources 30 are disposed on the substrate 20.

In order to facilitate understanding, a configuration of the illumination device 10 may be described below using a three-dimensional orthogonal coordinate system. The three-dimensional orthogonal coordinate system is composed of an X axis, a Y axis, and a Z axis. An XY plane including the X axis and the Y axis is parallel to one surface of the substrate 20. One surface of the substrate 20 is a plane, and is a first surface 21a of the substrate 20 as will be described below with reference to FIG. 3B. The plurality of light sources 30 are disposed on the first surface 21a. The Z axis is orthogonal to the XY plane. In the substrate 20, when a surface located on the opposite side of the first surface 21a is referred to as a second surface 21b, the positive direction of the Z axis is a direction from the first surface 21a toward the second surface 21b.

Hereinafter, viewing the negative direction side from the positive direction side of the Z axis may be referred to as a top view, and viewing the positive direction side from the negative direction side of the Z axis may be referred to as a bottom view. When the top view and the bottom view are not distinguished from each other, they may be referred to as a plan view. FIG. 1 is a perspective view of the illumination device 10 as viewed from the lower surface side.

In the light source module 15, the plurality of light sources 30 are disposed in an annular shape in a plan view. In the light source module 15, an optical axis of each of the plurality of light sources 30 is parallel to the Z axis direction, and the plurality of light sources 30 emit light downward.

The light reflective member 40 is disposed surrounding the plurality of light sources 30 disposed in an annular shape, and is provided covering all of the plurality of light sources 30. As will be described below with reference to FIG. 5, the light reflective member 40 is disposed surrounding the plurality of light sources 30 disposed in an annular shape, from the lateral side and the lower side of the plurality of light sources 30. A surface of the light reflective member 40 facing the plurality of light sources 30 is a reflective surface 42. The reflective surface 42 reflects the light emitted from each of the plurality of light sources 30 toward the lower side of the light reflective member 40 and toward the inner side from the position where the plurality of light sources 30 are disposed in an annular shape.

The light emitted from each of the plurality of light sources 30 includes light having high luminance and light having low luminance. For example, of the light emitted from each of the plurality of light sources 30, luminance of the light directed in a direction at a larger angle from the optical axis of the light source 30 is lower than luminance of the light directed in a direction at a smaller angle from the optical axis. For example, of the light emitted from each of the plurality of light sources 30, luminance of the light traveling mainly in the lateral direction of the light sources 30 is lower than luminance of the light traveling mainly in the downward direction of the light sources 30.

The light reflective member 40 reflects light having high luminance of light emitted from each of the plurality of light sources 30 such that the light having high luminance reaches a position farther away from the light sources 30 than a position where light having low luminance reaches. Therefore, light having high luminance reaches a position farther than a position where light having low luminance reaches. For example, of the light emitted from each of the plurality of light sources 30, the light traveling mainly in the downward direction of the light sources 30 reaches a position farther away from the light sources 30 than a position where the light traveling mainly in the lateral direction of the light source 30 reaches. The longer the optical path, the lower the luminance of the light, so that it is possible to reduce luminance unevenness of light with which the irradiation target is irradiated by disposing the irradiation target at an appropriate position below the illumination device 10.

In the illumination device 10, a region surrounded by the plurality of light sources 30 disposed in an annular shape is an opening, and is referred to as an opening region WP. The opening region WP is, for example, circular in a plan view, and the center of the circular opening region WP is a central axis A1. The central axis A1 is orthogonal to the XY plane and extends through the center of the opening region WP.

The light emitted from each of the plurality of light sources 30 is reflected by the light reflective member 40 and travels below the light sources 30 toward the central axis A1. In a case in which the irradiation target is placed below the illumination device 10 so as to overlap with the central axis A1 in the plan view, the irradiation target irradiated with the light emitted from each of the plurality of light sources 30 can be observed from above the illumination device 10 through the opening region WP.

As illustrated in FIGS. 1 and 2, the illumination device 10 further includes a housing 50. The housing 50 is a member having a hollow annular shape. The housing 50 houses the light source module 15 and the light reflective member 40 in a hollow interior. The housing 50 has an opening 52A on the inner peripheral side. The opening 52A is provided over the inner periphery of the housing 50. The light reflected by the light reflective member 40 is emitted from the opening 52A to the opening region WP. At a portion other than the opening 52A, the housing 50 blocks the light emitted from the light source module 15 and reflected by the light reflective member 40.

The configuration of the light source module 15 will be described in detail.

Figure 3A:
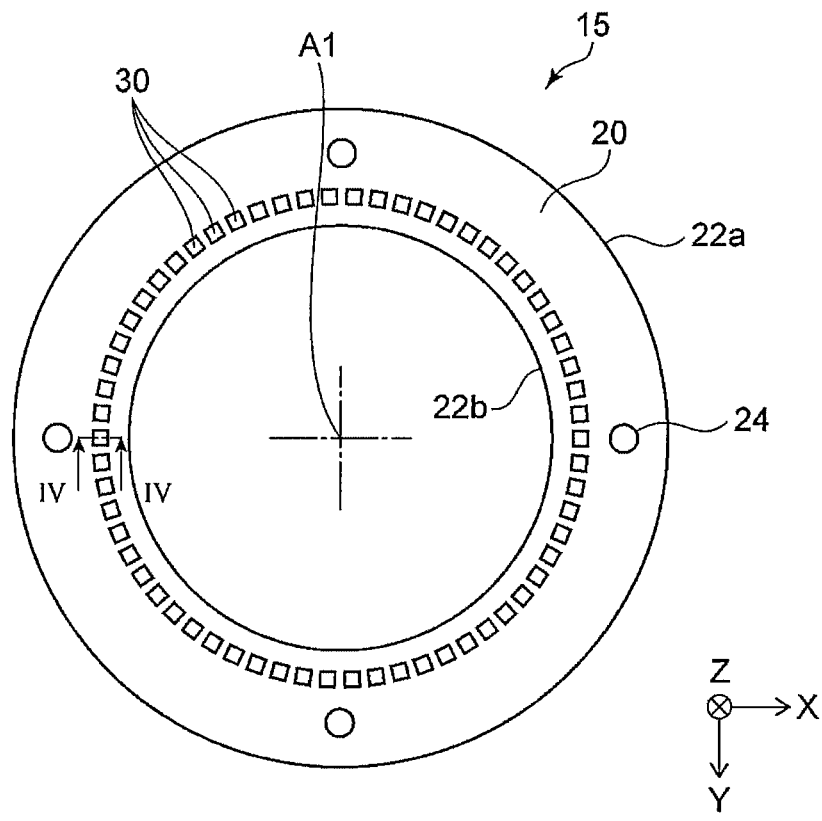
FIG. 3A is a schematic bottom view illustrating a light source module of the illumination device according to the first embodiment.

FIG. 3A is a schematic bottom view illustrating the light source module of the illumination device according to the first embodiment.

Figure 3B:
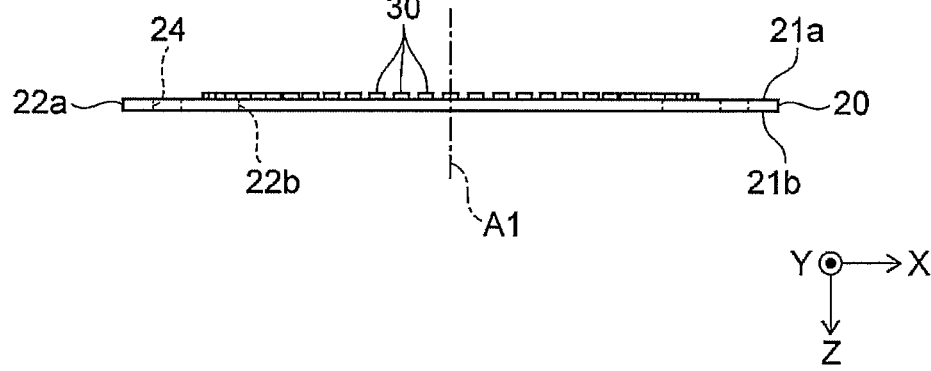
FIG. 3B is a schematic side view illustrating the light source module of the illumination device according to the first embodiment.

FIG. 3B is a schematic side view illustrating the light source module of the illumination device according to the first embodiment.

As illustrated in FIGS. 3A and 3B, the light source module 15 includes the substrate 20 having an annular shape and the plurality of light sources 30 disposed in an annular shape on the first surface 21a of the substrate 20. For example, the substrate 20 has a circular ring shape centered on the central axis A1. That is, the substrate 20 is a plate-shaped member partitioned by two concentric circles having the central axis A1 as a common center, and includes an edge portion 22a of an outer circle and an edge portion 22b of an inner circle. The plurality of light sources 30 are circumferentially disposed in a single circumference between the edge portions 22a and 22b.

In the present example, the substrate 20 is provided with a plurality of fitting hole portions 24 for coupling with the light reflective member 40. The fitting hole portions 24 are provided for coupling with the light reflective member 40. As will be described below with reference to FIG. 5, the fitting hole portions 24 are fitted to fitting projected portions 40b1 provided in the light reflective member 40, so that the substrate 20 and the light reflective member 40 are fitted and coupled to each other.

The substrate 20 is, for example, a printed wiring board. The substrate 20 includes a plate-shaped base material formed of an insulating resin or the like, and wiring lines formed of a conductive foil made of a Cu-based alloy or the like on the base material. For example, the substrate 20 is a glass epoxy substrate such as FR-4 or a glass composite substrate such as CEM-3. As long as the substrate 20 has the first surface 21a as a plane on which the plurality of light sources 30 are mounted, the substrate 20 is not limited to being formed of a resin, and can be a metal substrate or the like in which wiring lines are formed after insulation processing is performed on a surface of the metal substrate or the like. The material of the metal substrate is an alloy or the like containing Al, Cu, or the like. When the substrate 20 is a metal substrate, a higher heat dissipation effect can be achieved.

Figure 4A:
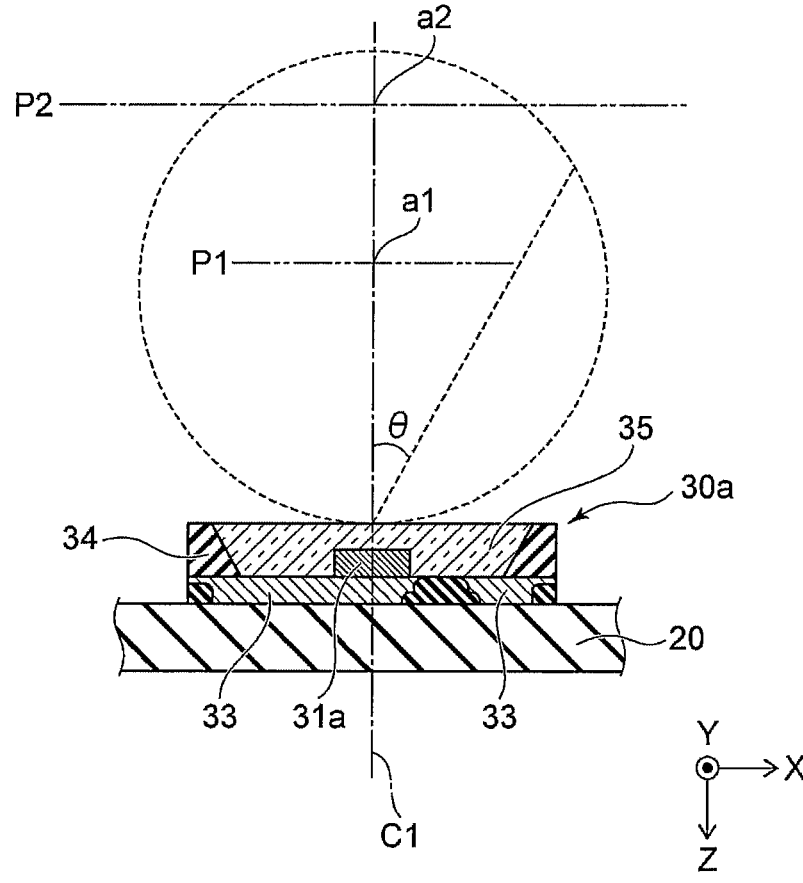
FIG. 4A is a schematic cross-sectional view illustrating a part of the light source module of the illumination device according to the first embodiment.
Figure 4B:
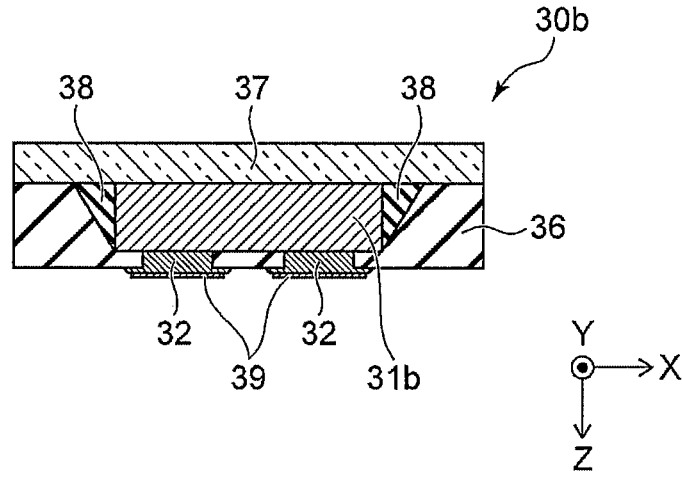
FIG. 4B is a schematic cross-sectional view illustrating a part of the light source module of the illumination device according to the first embodiment.

FIGS. 4A and 4B are schematic cross-sectional views illustrating a part of the illumination device according to the first embodiment.

Each of the plurality of light sources is, for example, a light-emitting device 30a including a light-emitting element 31a formed of a compound semiconductor. The light-emitting device 30a is, for example, a surface mount type light-emitting device including a lead 33, a resin-molded body 34, and the light-emitting element 31a.

In the light-emitting device 30a, for example, parts of a pair of the leads 33 having a plate shape are embedded in the resin-molded body 34. The resin-molded body 34 has a recessed portion defined by a bottom surface and a lateral surface, the bottom surface defining the recessed portion is constituted by a part of the pair of leads 33, and the lateral surface has a reflective surface having a predetermined inclination angle.

A space between the pair of leads 33 is filled with the resin-molded body 34 and constitutes a part of the bottom surface of the resin-molded body 34. The resin-molded body 34 has, for example, a quadrangular shape in a plan view. On the lower surface of the resin-molded body 34, parts of the pair of leads 33 are exposed as external terminal portions.

As a base material of the lead 33, for example, a plate-shaped body containing at least one metal selected from copper, aluminum, gold, silver, tungsten, iron, and nickel, an alloy such as an iron-nickel alloy or phosphor bronze, or a clad material can be used. In order to efficiently extract light from the light-emitting element 31a, a film containing silver, aluminum, gold, or an alloy thereof (for example, a film formed by plating) can be formed on the surfaces of the leads 33. The metal film formed on the surfaces of the leads 33 can be a single-layer film or a multilayer film.

As the resin-molded body 34, a resin containing a thermosetting resin or a thermoplastic resin can be used. In particular, a thermosetting resin is preferably used. The thermosetting resin preferably has a gas permeability lower than a gas permeability of a resin used for the sealing member 35, and specific examples thereof include an epoxy resin, a silicone resin, a modified epoxy resin such as a silicone-modified epoxy resin, a modified silicone resin such as an epoxy-modified silicone resin, polyimide resins, modified polyimide resins, urethane resins, and modified urethane resins. The resin-molded body 34 can contain titanium oxide, aluminum oxide, silicon oxide, or the like as an inorganic filler. When the inorganic filler is contained in the resin-molded body 34, the light transmittance of the resin-molded body 34 can be adjusted.

The light-emitting element 31a is mounted on, for example, one of the pair of leads 33 constituting the bottom surface defining the recessed portion. The light-emitting element 31a includes a pair of electrodes and is fixed to the lead 33 by, for example, a joining member. The light-emitting element 31a includes a pair of positive and negative electrodes, and the pair of positive and negative electrodes are electrically connected to the pair of leads 33 via wires, respectively. The light source can emit light by receiving power supply from an external source via the pair of leads 33.

As the light-emitting element 31a, a known light-emitting element can be used. For example, a light-emitting diode is preferably used as the light-emitting element 31a. The light-emitting element 31a can be selected from light-emitting elements having arbitrary wavelengths. For example, a semiconductor light-emitting element such as a light-emitting diode can be used, and the light-emitting element 31a that can emit visible light of blue, green, red, etc. can be used. As the blue and green light-emitting elements, those using a nitride-based semiconductor such as GaN, InGaN, AlGaN, or AlInGaN can be used. For the red light-emitting element, GaAlAs, AlInGaP, or the like can be used. Further, a semiconductor light-emitting element formed using a material other than those can be used. The composition, light emission color, size, number, and the like of light-emitting elements to be used can be appropriately selected according to the purpose. The light-emitting element 31a includes a semiconductor laminate, and the semiconductor laminate includes a semiconductor layer including a light-emitting layer. Further, a light-transmissive substrate of sapphire or the like can be provided.

The light-emitting element 31a is covered with a sealing member 35 having transmissivity. As the sealing member 35, a resin having excellent heat resistance, weather resistance, and light resistance is preferably used. Examples of such a resin include a silicone resin, a modified silicone resin, an epoxy resin, a modified epoxy resin, a urea resin, a phenol resin, an acrylic resin, a urethane resin, a fluororesin, or a resin containing two or more kinds of these resins.

In order to impart a predetermined function to the sealing member 35, at least one selected from the group consisting of an inorganic filler, a diffusion agent, a pigment, a phosphor, and a reflective substance can be mixed thereinto. As the diffusion agent, barium titanate, titanium oxide, aluminum oxide, silicon oxide, or the like can be suitably used. Further, the sealing member 35 can contain an organic or inorganic coloring dye or coloring pigment for the purpose of removing undesired wavelengths. Further, the sealing member 35 can contain, for example, a phosphor.

When the sealing member 35 contains a phosphor, the sealing member 35 functions as a wavelength conversion member. A phosphor that can be excited by light emitted from the light-emitting element 31a is used. For example, examples of the phosphor that can be excited by light emitted from a blue light-emitting element or an ultraviolet light-emitting element include cerium-activated yttrium aluminum garnet based phosphors (YAG: Ce), cerium-activated lutetium aluminum garnet based phosphors (LAG: Ce), europium and/or chromium-activated nitrogen-containing calcium alumino silica based phosphors ($CaO$—$Al_2O_3$—$SiO_2$), europium-activated silicate based phosphors (($Sr$, $Ba)_2SiO_4$), nitride based phosphors such as $\beta$-SiAlON phosphors, CASN based phosphors, and SCASN based phosphors, KSF based phosphors ($K_2SiF_6$: Mn), sulfide based phosphors, and quantum dot phosphors. By combining these phosphors with a blue light-emitting element or an ultraviolet light-emitting element, light-emitting devices of various colors (for example, white light-emitting devices) can be manufactured.

The light source can also be another light-emitting device 30b, as illustrated in FIG. 4B.

The light-emitting device 30b includes, for example, a light-emitting element 31b including an electrode 32, a resin-molded body 36, and a light-transmissive member 37. Further, a light guide member 38 and a metal film 39 can be included. The light-emitting element 31b includes a pair of the electrodes 32.

Resin-Molded Body 36

The resin-molded body 36 can be made of, for example, the same material as the resin-molded body 34 of the light-emitting device 30a.

Light-Transmissive Member 37

The light-transmissive member 37 is a member that covers the light-emitting surface (a surface opposite to the other surface of the semiconductor laminate) of the light-emitting element 31b, and is a member serving as a light extraction surface of the light-emitting device. As the light-transmissive member 37, a light-transmissive resin, glass, or the like can be used. For example, the light-transmissive resin can be made of the same material as that of the sealing member of the light-emitting device 30a.

The light-transmissive member 37 can contain a phosphor as a wavelength conversion member in addition to the light-transmissive material. The phosphor can be the same material as the material described for the light-emitting device 30a.

Further, the light-transmissive member 37 can contain an inorganic filler or the like. In addition, the light-transmissive member 37 can have a layered shape of two or more layers. For example, when the light-transmissive member 37 is formed of two layers, each layer can contain a phosphor, each layer can contain a different phosphor, only the layer on the light-emitting element side can contain a phosphor, or a three-layer light-transmissive member 37 can be formed by combining these layers.

The light-emitting device 30b can include a light guide member 38 between the light-emitting element 31b and the resin-molded body 36. The light guide member 38 guides light emitted from the lateral surface of the light-emitting element 31b to the light-transmissive member 37.

The light-emitting device 30b can include the metal film 39 on each of the surfaces of the electrodes 32. The metal film 39 is a film formed mainly for preventing corrosion and oxidation of the surfaces of the electrodes. As the material, a material more excellent in corrosion resistance and oxidation resistance than the material of the electrodes is selected. For example, the outermost layer is preferably made of a metal of a platinum group element such as Au or Pt. When the metal film covers the surface to be soldered of the light-emitting device, it is preferable to use Au, which has good solderability, for the outermost surface.

The light-emitting device 30a is disposed on the substrate 20 such that an optical axis C1 is orthogonal to the first surface 21a of the substrate 20. That is, the optical axis C1 of the light-emitting device 30a is parallel to the Z axis. The optical axis C1 is defined as follows. That is, the optical axis C1 is a straight line connecting the point a1 and the point a2. The point a1 is a point at which the luminance of the light emitted from the light-emitting device 30a is maximized on a first plane P1, which is a plane on the side where the light-emitting device 30a mainly emits light and is parallel to the XY plane. The point a2 is a point at which the luminance is maximized in a range irradiated with the light emitted from the light-emitting device 30a on a second plane P2, which is a plane parallel to the XY plane and is spaced apart from the first plane P1 in the traveling direction of the light. When there are a plurality of points at which the luminance is maximized on the second plane P2, the center or the center of gravity of a figure connecting the plurality of existing points can be set as the point a2.

For example, the light emitted from the light-emitting device 30a configured as described above can have a Lambertian light distribution. When the light emitted from the light-emitting device 30a has the Lambertian light distribution, the luminous intensity in the direction of the angle θ with respect to the optical axis C1 of the light-emitting device 30a can be approximated by $\cos^n θ$ times the light intensity on the optical axis C1. For example, n is in a range from 1 to 11. There are many planes including the optical axis C1 of the light emitted from the light-emitting device 30a, and it can be said that the light distribution pattern of the light emitted from the light-emitting device 30a is a Lambertian light distribution in each plane. Note that the definition of the optical axis of each of the light sources 30 is the same as the definition of the optical axis C1 of the light-emitting device 30a, and the optical axis of each of the light sources 30 is denoted by the same reference character "C1".

In the illumination device 10 according to the present embodiment, even when the light sources 30 emit the light having the Lambertian light distribution as described above, it is possible to reduce the luminance unevenness of the light with which the irradiation target is irradiated by reflecting the light in the direction according to each luminance.

The configuration of the light reflective member 40 will be described in detail. A more specific configuration of the light reflective member 40 will be described below with reference to FIGS. 7A and 7B.

Figure 5:
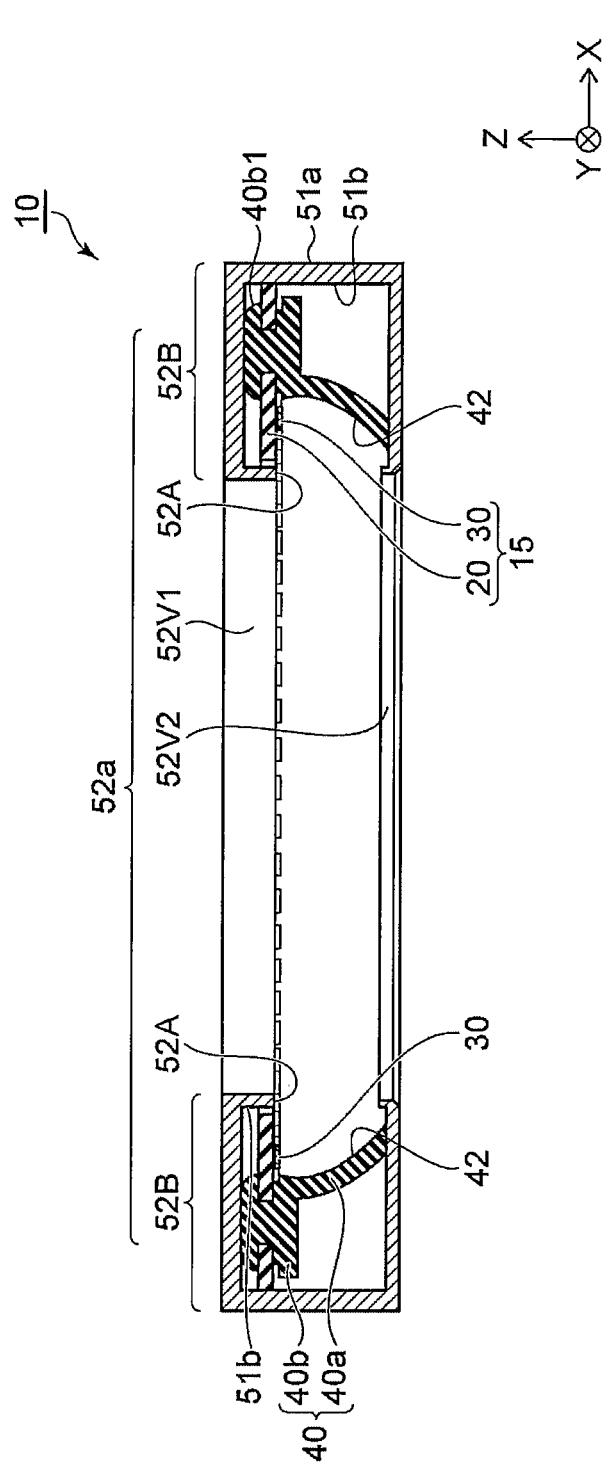
FIG. 5 is a schematic cross-sectional view taken along line V-V in FIG. 2.

FIG. 5 is a schematic cross-sectional view taken along line V-V in FIG. 2.

Figure 6:
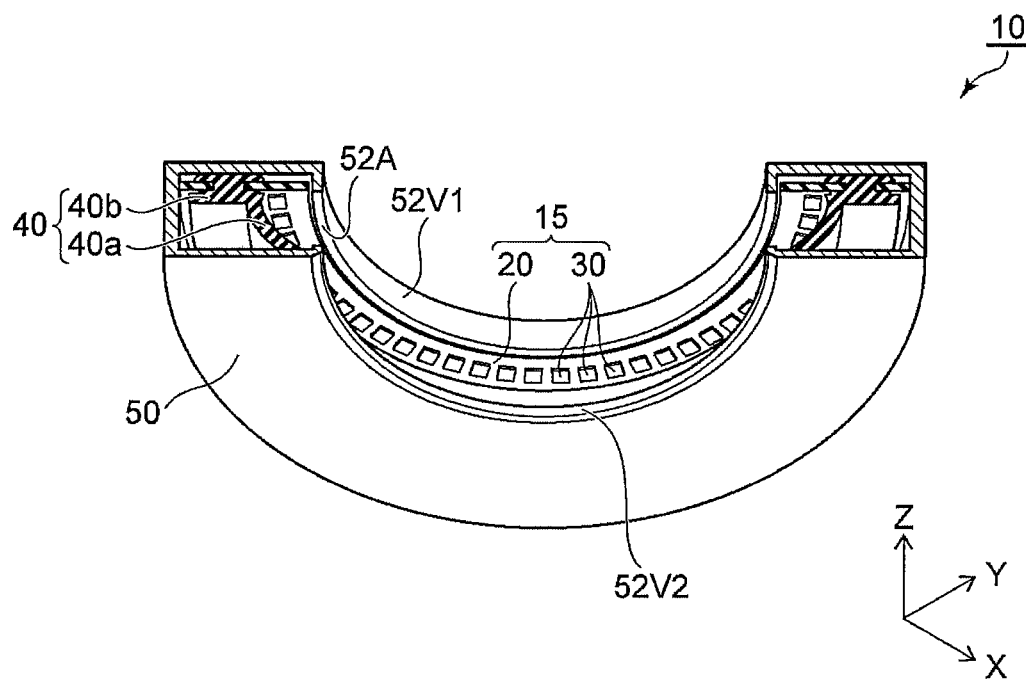
FIG. 6 is a schematic perspective cross-sectional view taken along line V-V in FIG. 2.

FIG. 6 is a schematic perspective cross-sectional view taken along line V-V in FIG. 2.

As illustrated in FIGS. 5 and 6, the light reflective member 40 includes a reflecting portion 40a and a support portion 40b. The light source module 15 is supported by the support portion 40b and coupled to the light reflective member 40.

The reflecting portion 40a is a cylindrical member having a length in the Z axis direction. The diameter of the circle of the reflecting portion 40a in a plan view increases from the lower side toward the upper side. The light source module 15 is disposed above the reflecting portion 40a. The light source module 15 is disposed such that the optical axes of the plurality of light sources 30 face downward.

The reflecting portion 40a has the reflective surface 42. The reflective surface 42 is provided on the inner surface of the cylinder forming the reflecting portion 40a. The reflective surface 42 is provided surrounding the lateral side of the plurality of light sources 30 and covering the lower side of the plurality of light sources 30. The reflective surface 42 reflects the light emitted downward from each of the plurality of light sources 30 toward the inside of the circular ring in which the plurality of light sources 30 are disposed. In addition, the reflective surface 42 reflects the light emitted from each of the plurality of light sources 30 toward the outside of the circular ring in which the plurality of light sources 30 are disposed, toward the inside of the circular ring in which the plurality of light sources 30 are disposed.

The reflective surface 42 is a concave surface which is a curved surface in a cross-sectional view and on which reflected light is condensed. The shape of the curved surface of the reflective surface 42 preferably follows an aspheric polynomial including a conic constant k, as described below in relation to FIGS. 7A and 7B. In the aspheric polynomial representing the curved surface of the reflective surface 42, the conic constant k is larger than −1 and smaller than 0.

Of the light emitted from the light sources 30, the light traveling downward and having high luminance is reflected by the reflective surface 42 at a position farther away from the substrate 20. The reflected light travels below the light sources 30 and toward the inside of the circular ring in which the plurality of light sources 30 are disposed. Of the light emitted from the light sources 30, light having low luminance directed toward the outside of the circular ring in which the plurality of light sources 30 are disposed is reflected by the reflective surface 42 at a position closer to the substrate 20. The reflected light travels below the light sources 30 and toward the inside of the circular ring. The light reflected by the reflective surface 42 is condensed at the condensing point and further travels. Of the light emitted from the light sources 30, by passing through the condensing point, the light having high luminance directed downward reaches a position farther away from the reflective surface 42 than a position where light having low luminance directed toward the outside of the circular ring reaches. Since the light having high luminance reaches the irradiation target through an optical path greater than an optical path of the light having low luminance, it is possible to reduce the luminance unevenness of the light with which the irradiation target is irradiated.

The light reflective member 40 is fixed to the substrate 20 by the support portion 40b. The support portion 40b is provided with, for example, a fitting projected portion 40b1. A plurality of the fitting projected portions 40b1 are provided. The plurality of fitting projected portions 40b1 are provided corresponding to the positions of the plurality of fitting hole portions 24 illustrated in FIG. 3A in a plan view. The plurality of fitting projected portions 40b1 are fitted into the plurality of fitting hole portions 24 of the substrate 20, respectively. Thus, the light reflective member 40 is coupled and fixed to the substrate 20.

The light reflective member 40 can be formed of any material as long as it can support the substrate 20 and have a stable reflective surface 42 having a desired curved surface. The reflective surface 42 is preferably formed of a material having a low surface roughness, but can be formed of a material that diffusely reflects light. For example, the light reflective member 40 is formed of a resin and a metal film provided on the surface of the resin. For the metal film provided on the resin surface, a material having high light reflectivity such as Al or Ag can be used. The light reflective member 40 itself can be made of a metal containing Al, Ag, or the like.

In the case in which the light reflective member 40 is formed by integral molding of a resin, the fitting projected portions 40b1 are inserted into the fitting hole portions 24 of the substrate 20, and then the tips of the inserted fitting projected portions 40b1 are subjected to heat treatment to increase the diameters, whereby the substrate 20 and the light reflective member 40 can be coupled to each other. Note that, in FIGS. 5 and 6, the fitting projected portions 40b1 are illustrated in a state of having an increased diameter after the heat treatment.

The configuration of the housing 50 will be described in detail with reference to FIGS. 5 and 6.

The housing 50 is provided with the opening 52A and a housing portion 52B. The housing portion 52B is an annular hollow portion. The housing portion 52B houses the light source module 15 and the light reflective member 40 which are coupled to each other, and fixes the light source module 15 and the light reflective member 40 at predetermined positions.

The opening 52A is provided on the inner edge side of the housing 50. The opening 52A is provided between a first observation port 52V1 and a second observation port 52V2. The opening 52A is provided on the inner edge side of the housing 50. The first observation port 52V1 and the second observation port 52V2 form circular spaces having substantially the same diameters in a plan view. An observer, an imaging device for imaging the irradiation target, or the like is disposed on the first observation port 52V1 side. The irradiation target is disposed on the second observation port 52V2 side. The irradiation target is irradiated, via the second observation port 52V2, with the light emitted from the opening 52A. The illuminated irradiation target can be observed through the first observation port 52V1 and the second observation port 52V2. That is, the first observation port 52V1 and the second observation port 52V2 form the opening region WP described in relation to FIGS. 1 and 2.

The housing 50 can be formed of any appropriate material as long as the material has sufficient strength and can stably fix the light source module 15 and the light reflective member 40 at predetermined positions when the light source module 15 and the light reflective member 40 are housed in the housing 50. The housing 50 can be formed using a metal such as Al, an alloy such as stainless steel, or a resin.

The outer surface of the housing 50 is a light absorbing surface 51a that absorbs light. The light absorbing surface 51a can be made of, for example, a black resin. The black color is preferably matte. The inner surface of the housing 50 is also preferably a light absorbing surface 51b. By forming the outer surface of the housing 50 as the light absorbing surface 51a, stray light due to reflection of external light, emission of light from the light source module 15, and reflection of light by the light reflective member 40 can be inhibited. In order to inhibit light leaking from the light source module 15 and the light reflective member 40 to the inside of the housing 50 from leaking to the outside, the inner surface of the housing 50 is also preferably the light absorbing surface 51b. The outer surface and the inner surface can be rough surfaces.

The operation of the illumination device 10 according to the present embodiment will be described.

Figure 7A:
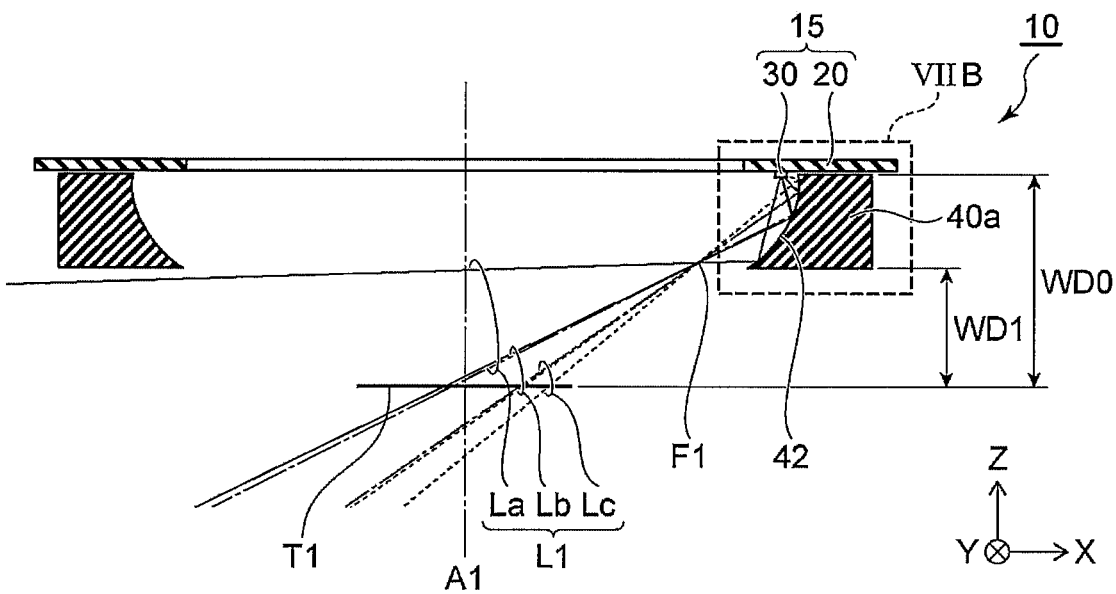
FIG. 7A is a schematic cross-sectional view for explaining an operation of the illumination device according to the first embodiment.

FIG. 7A is a schematic cross-sectional view for explaining an operation of the illumination device according to the first embodiment.

Figure 7B:
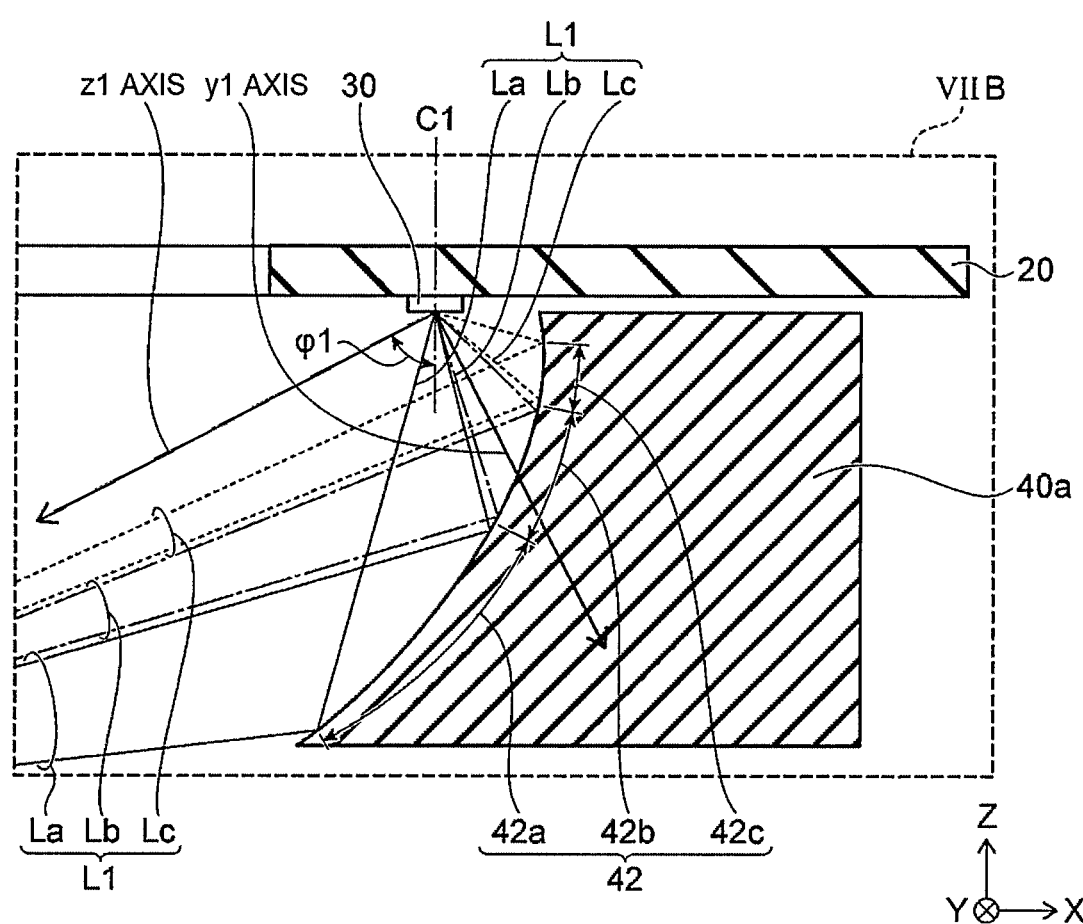
FIG. 7B is an enlarged schematic view of a portion VIIB of FIG. 7A.

FIG. 7B is an enlarged schematic view of a portion VIIB of FIG. 7A.

In FIGS. 7A and 7B, cross sections of the light source module 15 and the reflecting portion 40a of the light reflective member are illustrated in order to explain the operation of the illumination device 10.

In FIGS. 7A and 7B, a part of the illumination device 10 illustrated in FIG. 5 and the like is illustrated. In FIGS. 7A and 7B, the plurality of light sources 30 are disposed in an annular shape on the substrate 20, and light emitted from one light source 30 of the plurality of light sources 30 will be described. The plurality of lights emitted from the plurality of light sources 30 will be described below with reference to FIG. 8. In addition, in FIG. 7A, a positional relationship between the illumination device 10 and an irradiation target T1 illuminated by the illumination device 10 is illustrated. In the following description, it is assumed that light emitted from one light source 30 includes a plurality of lights in accordance with the intensity of the luminance and the direction. In FIGS. 7A and 7B, each of the plurality of lights is represented by illustrating the outermost ray of the light. Note that the omission of the illustration and the contents of the display of light are the same as those described above, in FIGS. 11 and 12.

As illustrated in FIG. 7A, the irradiation target T1 is disposed such that the center of the irradiation target T1 substantially coincides with the central axis A1 of the illumination device 10. The shape of the irradiation target T1 in a plan view can be arbitrary, but is assumed to be a square for the sake of simplicity in the following description. In addition, the surface of the irradiation target T1 can have an arbitrary shape having unevenness, but in the following description, it is assumed that the surface is a flat plane parallel to the XY plane.

The distance between the illumination device 10 and the irradiation target T1 is set as follows. That is, a distance WD1 is a distance along the Z axis from the end portion of the reflecting portion 40a located on the side opposite to the end portion on the substrate 20 side to the irradiation target T1. A distance WD0 is a distance for comparison with the case of the illumination device of Reference Example 1 described below with reference to FIG. 9, and is a distance along the Z axis from the end portion (light extraction surface) of each of the light sources 30 located on the side opposite to the substrate 20 to the irradiation target T1.

The light L1 emitted from the light sources 30 includes light La emitted in the direction of the optical axis C1 and light Lb and light Lc emitted at an angle from the optical axis C1. An emission angle of the light Lc from the optical axis C1 is larger than an emission angle of the light Lb from the optical axis C1. The luminance of the light La is higher than the luminance of the light Lb, and the luminance of the light Lb is higher than the luminance of the light Lc. In FIGS. 7A and 7B, the light La is represented by a solid line, the light Lb is represented by a one dot chain line, and the light Lc is represented by a broken line. In the drawings, the straight lines representing the lights La, Lb, and Lc represent the ranges of these lights. That is, the light La is light within a range of two solid lines with two solid lines as a boundary, the light Lb is light within a range of two one dot chain lines with the two one dot chain lines as boundaries, and the light Lc is light within a range of two broken lines with the two broken lines as boundaries. The representation of the lights La, Lb, and Lc in the drawings is the same as that in FIGS. 11 and 12.

The reflective surface 42 includes a plurality of reflective surfaces 42a, 42b, and 42c. The plurality of reflective surfaces 42a, 42b, and 42c are continuous and form one smooth reflecting curved surface. The reflective surface 42c is located at a position closer to the substrate 20 than the reflective surface 42b is, in the Z axis direction. The reflective surface (second reflective surface) 42b is located at a position closer to the substrate 20 than the reflective surface (first reflective surface) 42a is, in the Z axis direction.

The light (first light) La emitted along the optical axis C1 has the highest luminance and is reflected by the reflective surface 42a. The light (second light) Lb emitted at an angle from the optical axis C1 has luminance lower than luminance of the light La, and is reflected by the reflective surface 42b. The light Lc emitted at a larger angle from the optical axis C1 than the light Lb has luminance lower than luminance of the light Lb, and is reflected by the reflective surface 42c.

The lights La, Lb, and Lc are condensed at a condensing point F1 located between the reflective surface 42 and the irradiation target T1. In the illumination device 10 according to the present embodiment, it is possible to reduce luminance unevenness of the light with which the irradiation target T1 is irradiated, by appropriately setting the position of the condensing point F1.

The condensing point F1 can be set at an appropriate position by applying the conic constant k in an appropriate range to the aspheric polynomial shown in Equation (1) with respect to the reflective surface 42. Here, the conic constant k in an appropriate range is larger than $-1$ and smaller than 0. In Equation (1), k is a conic constant, c is a radius of curvature, c4 is a fourth order coefficient, c6 is a sixth order coefficient, and c8 is an eighth order coefficient.

[Math. 1]

$$z1 = \frac{cy1^2}{1 + \sqrt{1 - (1+k)c^2 y1^2}} + \sum_{i=2}^{4} c_{2n} y1^{2n} \tag{1}$$

FIG. 7B illustrates coordinate axes for applying the aspheric polynomial of Equation (1). The y1 and z1 axes are set to apply the aspheric polynomial of Equation (1) to the light source 30 illustrated in FIG. 7B. The y1 and z1 axes are distinguished from the X, Y, and Z axes. In the specific example of FIG. 7B, the y1 and z1 axes are applied in a plane parallel to the XZ plane. The y1 and z1 axes have their origins at the center of the end portion of the light source 30. The end portion of the light source 30 means a surface located on the side opposite to the surface facing the substrate 20. A straight line connecting the origin and the desired condensing point F1 is defined as the z1 axis. The positive direction of the z1 axis is the direction from the origin toward the condensing point F1. The z1 axis is inclined from the optical axis C1 of the light source 30 by an angle ω1. The y1 axis is orthogonal to the z1 axis. The positive direction of the y1 axis is the direction from the origin toward the reflective surface 42.

The aspheric polynomial of Equation (1) is applied for each light source 30. As will be described below with reference to FIG. 8, in the illumination device 10, the plurality of light sources 30 are disposed in an annular shape to form a plurality of the condensing points F1. In a specific application to the illumination device 10, for each of the light sources 30, a plane that includes the light source 30 and the condensing point F1 formed by the light source 30 and is parallel to the XY plane is defined, and the aspheric polynomial of Equation (1) is applied.

By setting the conic constant k to larger than $-1$ and smaller than 0, the lights La, Lb, and Lc are condensed at the condensing point F1. As illustrated in FIG. 7A, the light La reaches a farther position of the irradiation target T1 after passing through the condensing point F1. After passing through the condensing point F1, the light Lc reaches a closer position of the irradiation target T1. After passing through the condensing point F1, the light Lb reaches a position between the position where the light La reaches and the position where the light Lb reaches on the irradiation target T1. Regarding the positions at which the lights La, Lb, and Lc reach the irradiation target T1, the "farther position" indicates that the absolute values of the X-coordinates are larger on the negative direction side of the X axis. Regarding the positions at which the lights La, Lb, and Lc reach the irradiation target T1, the "closer position" indicates that the absolute values of the X-coordinates are smaller on the negative direction side of the X axis.

The luminance of the light La is higher than the luminance of the light Lb, and the luminance of the light Lb is higher than the luminance of the light Lc. The optical path of the light La is greater than the optical path of the light Lb, and the optical path of the light Lb is greater than the optical path of the light Lc. The longer the optical path, the lower the luminance of the light. The optical path length for the light La to reach the position of the irradiation target T1 is greater than the optical path length for the light Lb to reach the position of the irradiation target T1. The optical path length for the light Lb to reach the position of the irradiation target T1 is greater than the optical path length for the light Lc to reach the position of the irradiation target T1. Therefore, by appropriately setting the position at which the condensing point F1 is formed according to the distance WD1, it is possible to reduce the luminance unevenness of the light with which the irradiation target T1 irradiated with the light La, Lb, and Lc is irradiated.

Figure 8:
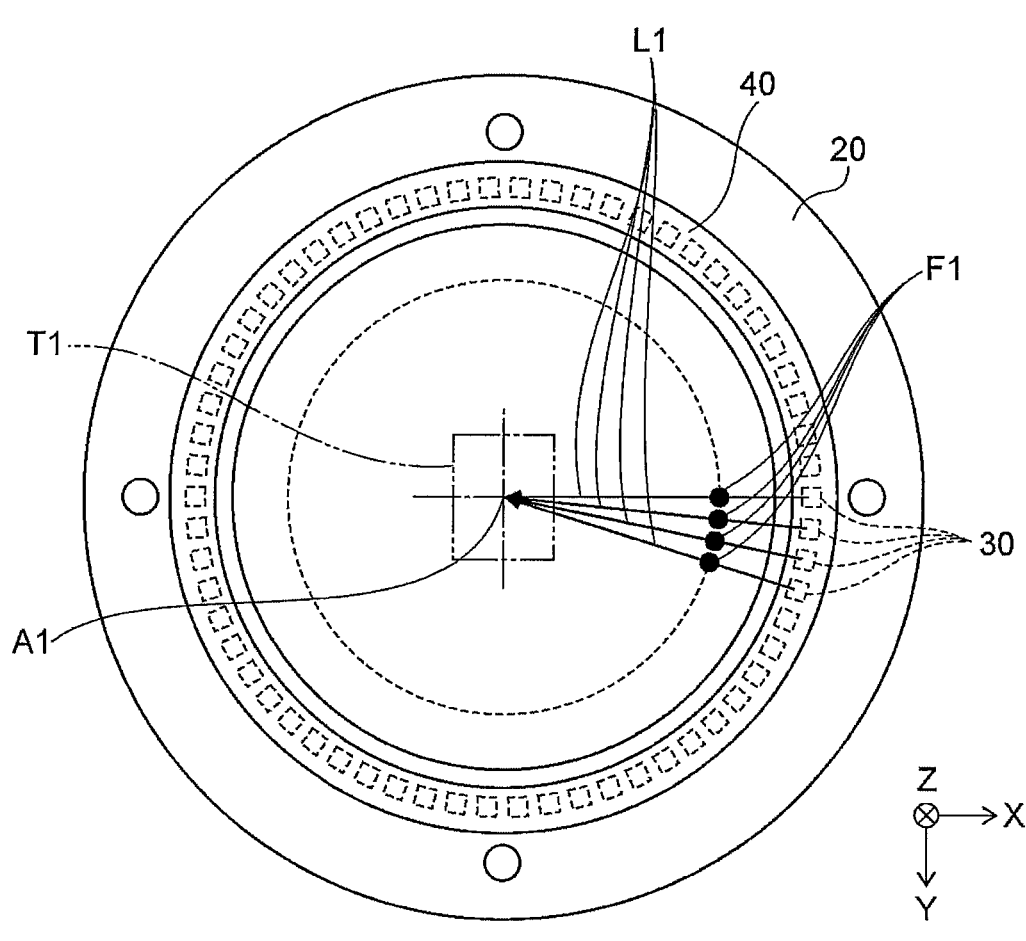
FIG. 8 is a schematic view for explaining an operation of the illumination device according to the first embodiment.

FIG. 8 is a schematic view for explaining an operation of the illumination device according to the first embodiment. FIG. 8 schematically illustrates a bottom view of the illumination device 10 in which the light reflective member 40 is disposed to the light source module 15. In order to avoid complexity of illustration, the following illustration is omitted. That is, in FIG. 8, the housing 50 is not illustrated. Further, in FIG. 8, the plurality of light sources 30 disposed in an annular shape are illustrated, but the light L1 emitted from a part of the light sources 30 and the condensing point F1 of the light L1 are illustrated. A curve connecting a plurality of the condensing points F1 formed by a plurality of the lights L1 emitted from the plurality of light sources 30 is represented by a broken line.

As illustrated in FIG. 8, in the illumination device 10, the plurality of lights L1 emitted from the plurality of light sources 30 are reflected by the light reflective member 40 and have the plurality of condensing points F1, respectively. The plurality of lights L1 reflected by the light reflective member 40 pass through the plurality of condensing points F1, respectively, and then travel toward the irradiation target T1. In the specific example, the plurality of lights L1 are condensed at a point where the central axis A1 intersects the irradiation target T1.

By annularly disposing the plurality of light sources 30 around the central axis A1 such that the plurality of emitted lights L1 are directed toward the center, it is possible to reduce luminance unevenness of the light with which the irradiation target T1 is irradiated.

In order to more easily understand the operation of the illumination device 10 according to the present embodiment, the operation in the case of Reference Example 1 will be described.

Figure 9:
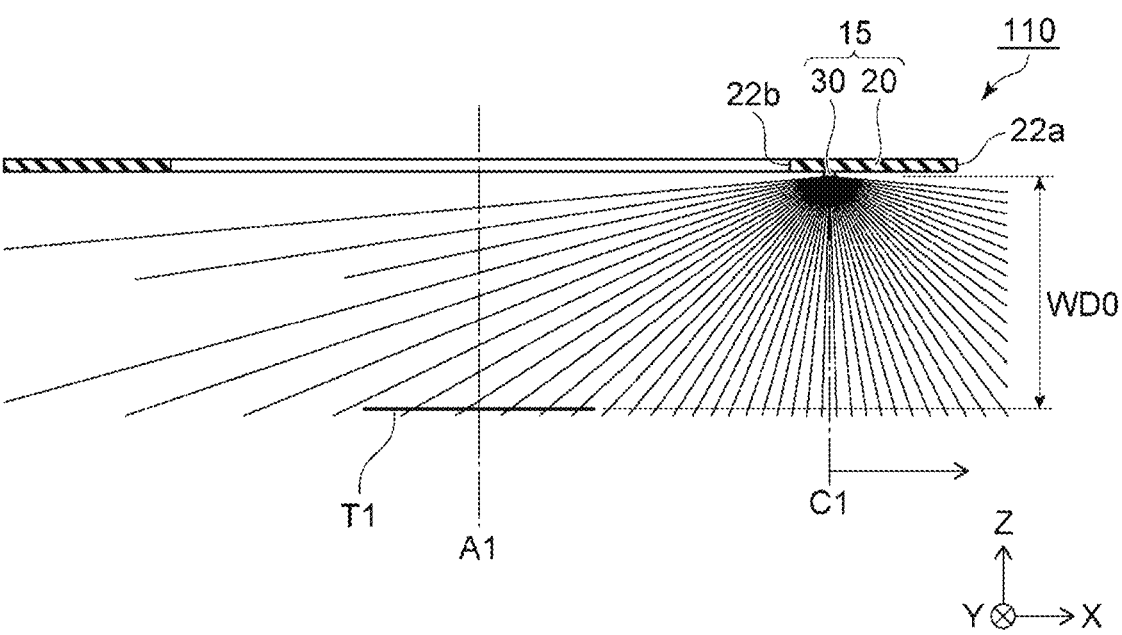
FIG. 9 is a schematic cross-sectional view for explaining an operation of an illumination device according to Reference Example 1.

FIG. 9 is a schematic cross-sectional view for explaining the operation of the illumination device according to Reference Example 1.

In FIG. 9, the light emitted from the light sources 30 is represented as a bundle of light rays.

An illumination device 110 illustrated in FIG. 9 includes the light source module 15, but does not include the light reflective member 40 illustrated in FIG. 7A. In the example of FIG. 9, the housing is not illustrated and one of the light sources 30 is illustrated as in the case of FIG. 7A. The distance WD0 between the light source 30 and the irradiation target T1 is the same as the distance WD0 in the case of the illumination device 10 illustrated in FIG. 7A.

As illustrated in FIG. 9, the light source 30 mounted on the substrate 20 emits, for example, light having a Lambertian light distribution. In FIG. 9, the light is represented as a bundle of light rays emitted from the light source 30, and is radiated around the light source 30 according to the light distribution characteristics. For example, the light is also emitted to the side of the edge portion 22b on the inner side of the substrate 20 from the optical axis C1, and is also emitted to the side of the edge portion 22a on the outer side of the substrate 20. Since the irradiation target T1 is not present on the side of the edge portion 22a on the outer side of the substrate 20, the light emitted to the side of the edge portion 22a on the outer side of the substrate 20 does not contribute to the illumination of the irradiation target T1.

Figure 10A:
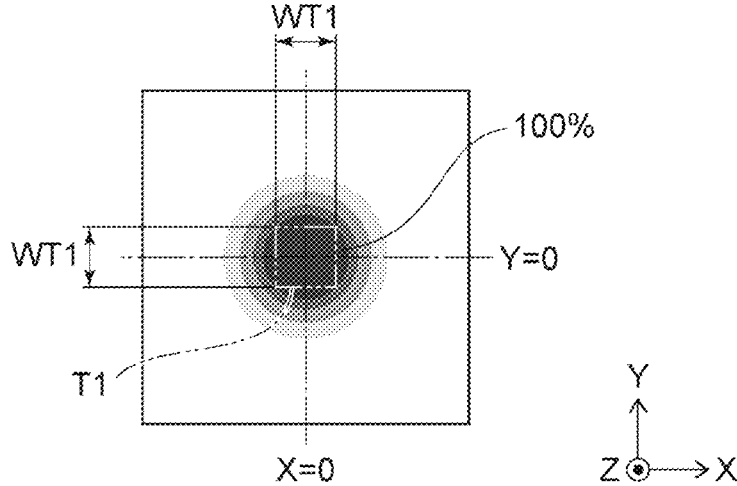
FIG. 10A is a graph obtained by operating the illumination device according to the first embodiment.

FIG. 10A is a graph obtained by operating the illumination device according to the first embodiment.

Figure 10B:
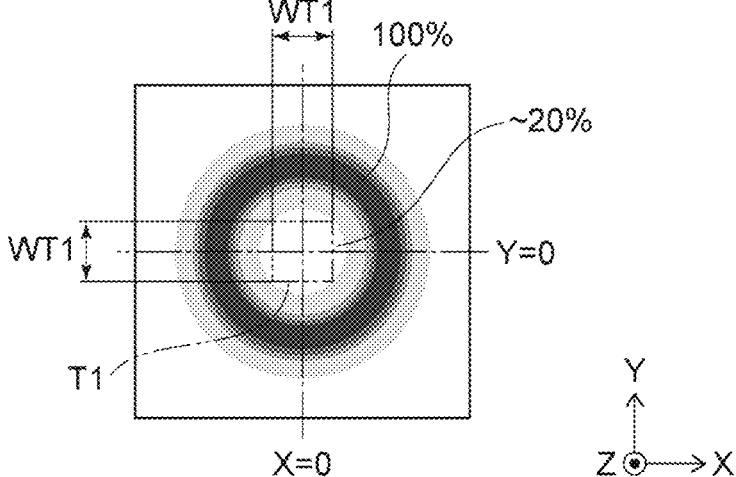
FIG. 10B is a graph obtained by operating the illumination device according to Reference Example 1.

FIG. 10B is a graph obtained by operating the illumination device according to Reference Example 1.

Figure 10C:
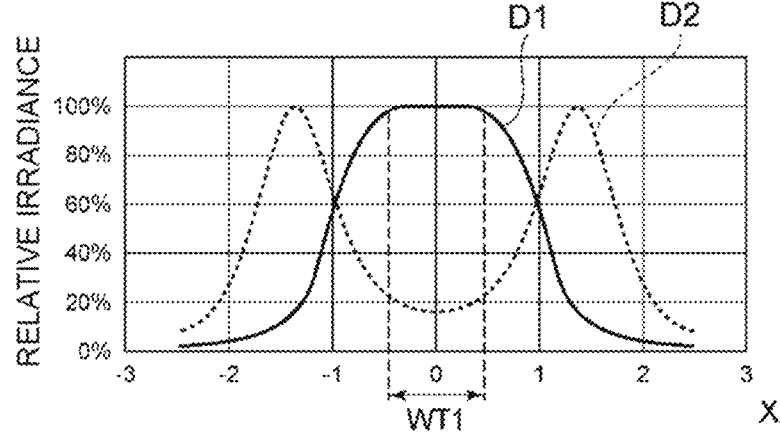
FIG. 10C is a graph collectively showing measurement results of illuminance distributions of the illumination device according to the first embodiment and the illumination device according to Reference Example 1.

FIG. 10C is a graph collectively showing the measurement results of the illuminance distributions of the illumination device according to the first embodiment and the illumination device according to Reference Example 1.

FIGS. 10A and 10B schematically illustrate contour diagrams of illuminance in cases in which the illumination device 10 according to the present embodiment and the illumination device 110 according to Reference Example 1 illuminate the irradiation target T1 at the same distance WD0.

FIG. 10C is a graph showing the X-coordinate dependency of the relative illuminance of FIGS. 10A and 10B at Y=0, with the surface of the irradiation target T1 as the XY plane. D1 represents the measurement result of the illumination device 10, and D2 represents the measurement result of the illumination device 110. The scale on the horizontal axis of FIG. 10C represents a relative coordinate in the X axis direction, which is a relative value when the length WT1 of the irradiation target T1 in the X axis direction is set to 1.

In each of FIGS. 10A to 10C, the lengths of the irradiation target T1 in the X direction and the Y direction are denoted as WT1.

As illustrated in FIGS. 10A and 10C, in the illumination device 10, the region where the relative illuminance is 100% includes substantially the entire region of the irradiation target T1. On the other hand, as illustrated in FIGS. 10B and 10C, in the illumination device 110, the region of the irradiation target T1 has a relative illuminance lower than 20%, and the region having a relative illuminance of 100% surrounds the outside of the region of the irradiation target T1. Furthermore, as illustrated in FIG. 10C, in the illumination device 110, the relative illuminance of the region of the irradiation target T1 is lower than 20%, and the relative illuminance is lower toward the inside. That is, in the illumination device 110, the irradiation target T1 cannot be brightly illuminated, and luminance unevenness occurs.

Figure 11:
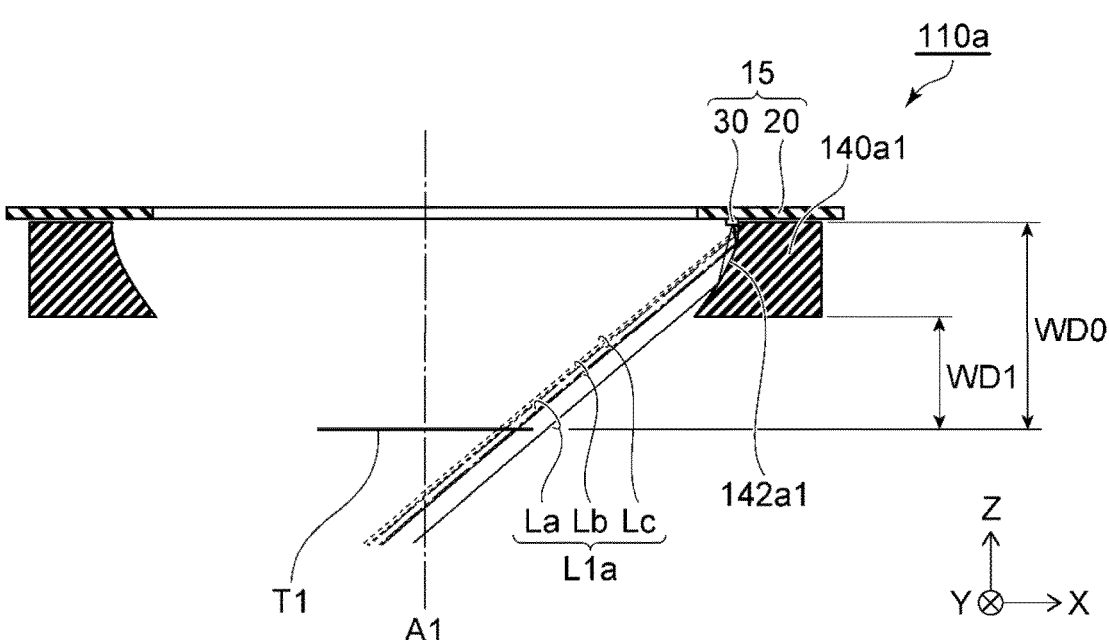
FIG. 11 is a schematic cross-sectional view for explaining an operation of an illumination device according to Reference Example 2.
Figure 12:
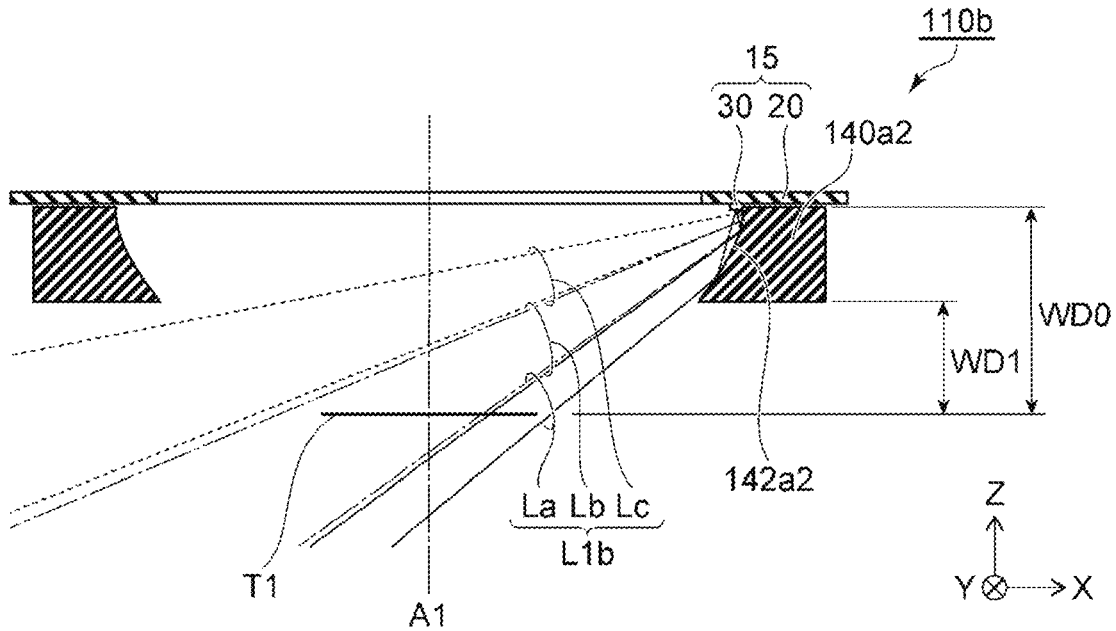
FIG. 12 is a schematic cross-sectional view for explaining an operation of an illumination device according to Reference Example 3.

FIGS. 11 and 12 are schematic cross-sectional views for explaining the operations of the illumination devices according to Reference Example 2 and Reference Example 3, respectively.

FIGS. 11 and 12 illustrate the cases where, in illumination devices 110a and 110b, lights L1a and L1b reflected by reflective surfaces 142a1 and 142a2 of reflecting portions 140a1 and 140a2 of the light reflective member are not condensed, respectively. FIG. 11 illustrates an example of a case in which the conic constant k=−1 in the aspheric polynomial of Equation (1), and the lights La, Lb, and Lc emitted from the light source 30 are reflected by the reflecting portion 140a1 while diverging, become parallel lights, and reach the irradiation target T1. FIG. 12 illustrates an example of a case in which the conic constant k<−1 in the aspheric polynomial of Equation (1), and the lights La, Lb, and Lc emitted from the light source 30 are reflected by the reflecting portion 140a2 while diverging, and reach the irradiation target T1 while further diverging.

Figure 13A:
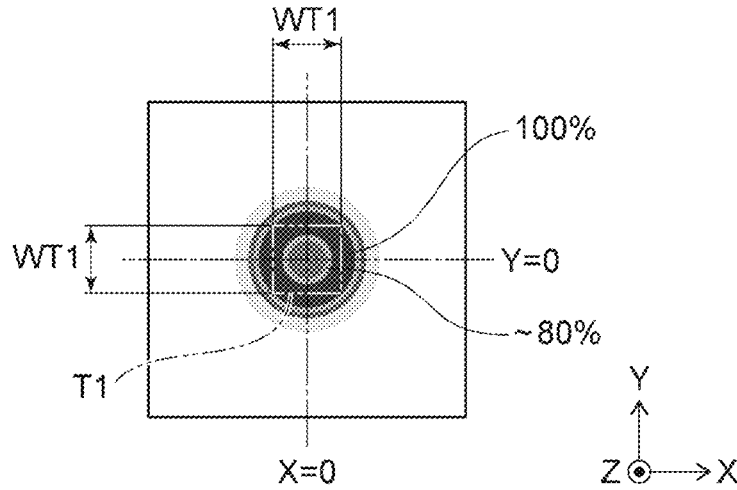
FIG. 13A is a graph obtained by operating the illumination device of FIG. 11.

As illustrated in FIG. 11, the light L1a emitted from the light source 30 includes lights La, Lb, and Lc, and the lights La, Lb, and Lc are reflected by the reflecting portion 140a1 while diverging as in the case of FIG. 7A. All of the reflected lights La, Lb, and Lc become parallel lights and illuminate the irradiation target T1. In the light L1a, as illustrated in FIG. 13A to be described below, the region of the irradiation target T1 has a relative illuminance lower than 80%, and the region having a relative illuminance of 100% surrounds the outside of the region of the irradiation target T1. That is, it can be seen that luminance unevenness is reduced as compared with the case of the illumination device 110 of Reference Example 1 illustrated in FIG. 10B, but luminance unevenness occurs as compared with the case of the illumination device 10 of the first embodiment illustrated in FIG. 10A.

Figure 13B:
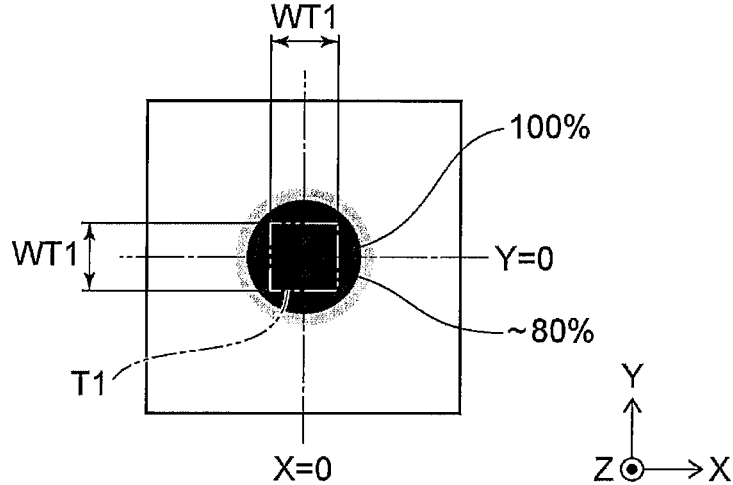
FIG. 13B is a graph obtained by operating the illumination device of FIG. 12.

As illustrated in FIG. 12, the light L1b emitted from the light source 30 includes lights La, Lb, and Lc, and the lights La, Lb, and Lc are reflected by the reflective surface 142a2 of the reflecting portion 140a2 while diverging as in the case of FIG. 7A. The reflected La, Lb, and Lc travel while diverging, and illuminate the irradiation target T1. In the light L1b, as illustrated in FIG. 13B to be described below, the region of the irradiation target T1 has a relative illuminance lower than 80%, and the region having a relative illuminance of 100% surrounds the outside of the region of the irradiation target T1. That is, it can be seen that luminance unevenness is reduced as compared with the case of the illumination device 110 of Reference Example 1 illustrated in FIG. 10B, but luminance unevenness occurs as compared with the case of the illumination device 10 of the first embodiment illustrated in FIG. 10A.

FIG. 13A is a graph obtained by operating the illumination device of FIG. 11.

FIG. 13B is a graph obtained by operating the illumination device of FIG. 12.

Figure 13C:
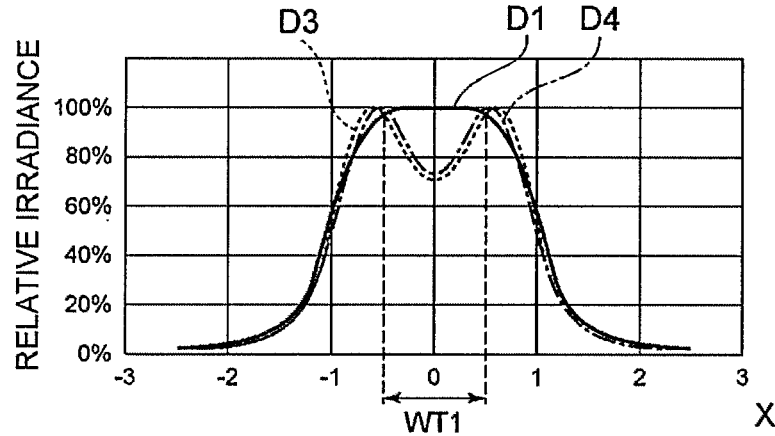
FIG. 13C is a graph collectively showing measurement results of illuminance distributions of the illumination device according to the first embodiment, the illumination device of FIG. 11, and the illumination device of FIG. 12.

FIG. 13C is a graph collectively showing measurement results of illuminance distributions of the illumination device according to the first embodiment, the illumination device of FIG. 11, and the illumination device of FIG. 12.

FIG. 13A schematically illustrates a contour diagram of the illuminance of the irradiation target T1 illuminated by the illumination device 110a illustrated in FIG. 11. FIG. 13B schematically illustrates a contour diagram of the illuminance of the irradiation target T1 illuminated by the illumination device 110b illustrated in FIG. 12. FIG. 13C is a graph showing the X-coordinate dependency of the relative illuminance of FIGS. 13A and 13B at Y=0, with the surface of the irradiation target T1 as the XY plane. D3 represents the measurement result of the illumination device 110a, and D4 represents the measurement result of the illumination device 110b. In FIG. 13C, the measurement result D1 of the illumination device illustrated in FIG. 10C is also illustrated for comparison.

As illustrated in FIGS. 13A and 13C, in the illumination device 110a, a region where the relative illuminance is 100% surrounds the irradiation target T1, whereas the relative illuminance is lower than 80% near the center of the irradiation target T1.

As illustrated in FIGS. 13B and 13C, in the illumination device 110b as well, a region where the relative illuminance is 100% surrounds the irradiation target T1, whereas the relative illuminance is lower than 80% near the center of the irradiation target T1.

As shown in FIG. 13C, in the illumination devices 110a and 110b, the relative illuminance continuously changes from about 70% to 100% from the center portion of the irradiation target T1 toward the outside. Therefore, the surface of the irradiation target T1 illuminated by the illumination devices 110a and 110b has luminance unevenness.

In the illumination device 10 according to the present embodiment, the conic constant k is set to a value larger than −1 and smaller than 0 and the other constants are changed in the aspheric polynomial shown in Equation (1), whereby the irradiation target T1 can be disposed at arbitrary distances from the illumination device. To be more specific, it is possible to set the coefficients and curvatures of the aspheric polynomial of Equation (1) to appropriate values by setting the condensing point at an appropriate position in accordance with the distance WD1 between the illumination device 10 and the irradiation target T1 and executing optical simulation or the like.

Effects of the illumination device 10 according to the present embodiment will be described.

The illumination device 10 according to the present embodiment includes the plurality of light sources 30 disposed on the substrate 20, and the light reflective member having the reflective surface 42 that reflects the light emitted from each of the plurality of light sources 30. The light L1 emitted from the plurality of light sources 30 is a bundle of a plurality of the lights La, Lb, and Lc having different luminances depending on the emission direction.

The angles of the lights La, Lb, and Lc from the optical axis C1 of each of the light sources 30 are larger in this order. The luminances of the lights La, Lb, and Lc are lower in this order. In other words, the light sources 30 emit the light L1 having lower luminance as the angle from the optical axis C1 increases.

The reflective surface 42 of the light reflective member 40 has the reflective surfaces 42a, 42b, and 42c, and the reflective surfaces 42a, 42b, and 42c are continuous curved surfaces. The reflective surfaces 42a, 42b, and 42c are located farther away from the substrate 20 in this order. The light La is reflected by the reflective surface 42a, the light Lb is reflected by the reflective surface 42b, and the light Lc is reflected by the reflective surface 42c. The lights La, Lb, and Lc reflected by the reflective surfaces 42a, 42b, and 42c, respectively, are condensed at the condensing point F1.

Since the condensing point F1 is formed between the irradiation target T1 and the reflective surface 42, the light La reaches a position farther away from the reflective surface 42, in the irradiation target T1. The light Lb reaches a position closer to the reflective surface 42 than the position where the light La reaches, and the light Lc reaches a position closer to the reflective surface 42 than the position where the light Lb reaches. Therefore, the irradiation target T1 can be illuminated with light with reduced luminance unevenness.

The illumination device 10 according to the present embodiment includes the light reflective member, and can reflect the light L1 emitted from each of the plurality of light sources 30 in a desired direction. There is no need to change the respective optical axes C1 of the plurality of light sources 30 in accordance with the distances to the irradiation target T1, and the optical axes C1 can be set in the same direction.

The optical axis C1 of each of the light sources 30 can be set orthogonal to the first surface 21a of the substrate 20, which is the mounting surface of the light sources 30. Therefore, a general-purpose rigid substrate such as FR-4 or CEM-3 can be used, and the light source module 15 can be formed at low cost.

Conventionally, as a light source of a ring-shaped illumination device, for example, Patent Document 1 is known. In such a conventional illumination device, there is a concern that the wiring lines formed on the substrate obtained by bending the substrate, the connection reliability of the light-emitting device connected to the wiring lines, and the like can be degraded. In addition, since the optical axis of the light-emitting device is set by bending the substrate or the like, it is necessary to reset the degree of bending of the substrate in a case in which the inclination of the optical axis is changed according to the distance to the irradiation target. Furthermore, in the case in which the light-emitting device is mounted on a flexible substrate, it is often difficult to efficiently dissipate heat from the light-emitting device, and thus it is difficult to obtain an illumination device that can irradiate an irradiation target with light having high luminance.

In the illumination device 10 according to the present embodiment configured as described above, since the plurality of light sources are disposed on a general-purpose rigid substrate with the optical axes aligned, it is not necessary to mechanically change the substrate 20. Therefore, since mechanical stress is not applied to the substrate 20 after the light sources 30 are mounted on the substrate 20, it is possible to easily achieve high connection reliability between the light sources 30 and the wiring lines of the substrate 20.

When the distance between the illumination device and the irradiation target T1 is changed, the distance can be easily changed by appropriately setting the reflective surface of the light reflective member. Even when the light reflective member is changed according to the distance, the light source module 15 can be used in common. Therefore, it is possible to quickly provide an illumination device according to the distance.

As described above, in the illumination device 10 according to the present embodiment, the light source module 15 can be configured using a general-purpose rigid substrate. Therefore, the optical axes C1 of the light sources 30 can be set in the same direction. Therefore, the light-emitting devices 30*a* and 30*b* having the surface mount type packages illustrated in FIGS. 4A and 4B can be used as the light sources. When the light-emitting devices 30*a* and 30*b* having the surface mount type packages are used as the light sources, the leads 33 and the electrodes 32 having large areas can be disposed over the mounting surface and can be connected to the wiring lines on the substrate 20 side. Heat resistance between the light-emitting element 31*a*, 31*b* and the substrate 20 can be reduced, and heat radiation of the light-emitting device 30*a*, 30*b* can be efficiently performed via the substrate 20. Therefore, it is easy to increase the luminance of the illumination device 10. In addition, by using the light-emitting devices 30*a* and 30*b* having the surface mount type packages as the light sources, it is possible to reduce the height of the light source module 15 and thus to reduce the thickness of the illumination device 10.

As described above in relation to FIG. 4A, the light emitted from the light-emitting device 30*a* can have a Lambertian light distribution, and the other light sources 30 can also have a Lambertian light distribution. Light having a Lambertian light distribution has a directivity wider than a directivity of a conventional illumination device. In the illumination device 10, light having a large angle from the optical axis C1 of the light source 30 can also be reflected by the reflective surfaces 42*b* and 42*c* of the light reflective member 40 and emitted toward the irradiation target T1. The reflective surfaces 42*b* and 42*c* are located at a position closer to the light source module 15 than the reflective surface 42*a* that reflects light in the direction of the optical axis C1 and light having a small angle from the direction of the optical axis C1. In the illumination device 10, the light La reflected by the reflective surface 42*a* and the lights Lb and Lc respectively reflected by the reflective surfaces 42*b* and 42*c* are condensed at the condensing point F1. Therefore, the light La having high luminance can reach a position farther on the irradiation target T1 than the positions where the lights Lb and Lc having low luminance reach, and luminance unevenness of the light with which the irradiation target T1 is irradiated can be reduced.

In the illumination device 10, the plurality of light sources 30 are disposed in a circular annular shape around the central axis A1 in a plane parallel to the XY plane. The plurality of lights emitted from the plurality of light sources 30 are reflected by the reflective surface 42, are respectively condensed at the plurality of condensing points F1, and then travel toward the central axis A1. Therefore, the plurality of condensing points F1 are formed in a circular shape around the central axis A1. By disposing the irradiation target T1 at a position including the central axis A1 on a plane parallel to the XY plane, the irradiation target T1 is irradiated with the plurality of lights emitted from the plurality of light sources 30, and thus the irradiation target T1 can be irradiated with sufficient luminance.

It is known that when a lens is disposed anywhere in the optical path of light emitted from a light source, chromatic aberration occurs. When the light emitted from the light source is white light, a large color shift occurs due to chromatic aberration caused by the lens since the white light includes light of a large number of colors. In the illumination device 10 according to the present embodiment, no lens is disposed in the optical path through which the light emitted from each of the light sources 30 travels. Therefore, it is possible to irradiate the irradiation target with light in which color unevenness is reduced, without causing chromatic aberration due to the lens.

In the above-described specific example, the plurality of light sources 30 are disposed in a circular annular shape, but no such limitation is intended, and the plurality of light sources 30 can be disposed in an elliptical annular shape, a polygonal annular shape, or the like according to the light distribution pattern of each of the plurality of light sources 30, the intensity of luminance, the shape of the irradiation target, or the like. In order to obtain an effect similar to that described above, the plurality of light sources 30 are not necessarily disposed in a stationary manner. For example, one light source 30 can be circularly rotated in a plane parallel to the XY plane. In addition, a light source in which the plurality of light sources 30 are linearly disposed can be circularly rotated in a plane parallel to the XY plane.

Second Embodiment

Figure 14A:
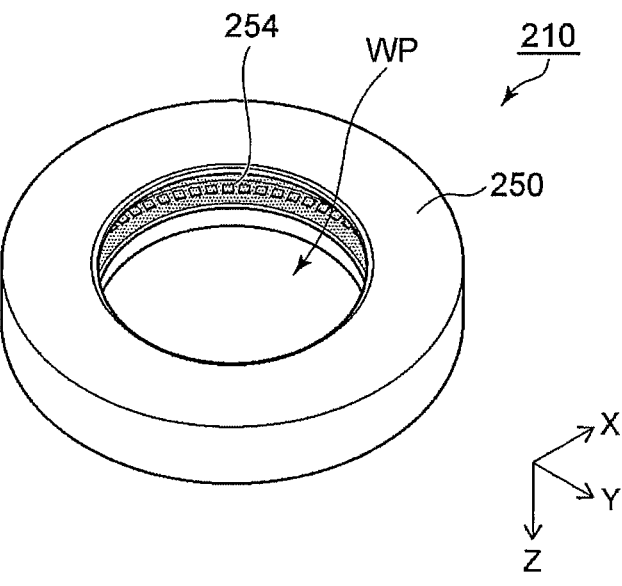
FIG. 14A is a schematic perspective view illustrating an illumination device according to a second embodiment.

FIG. 14A is a schematic perspective view illustrating an illumination device according to a second embodiment.

Figure 14B:
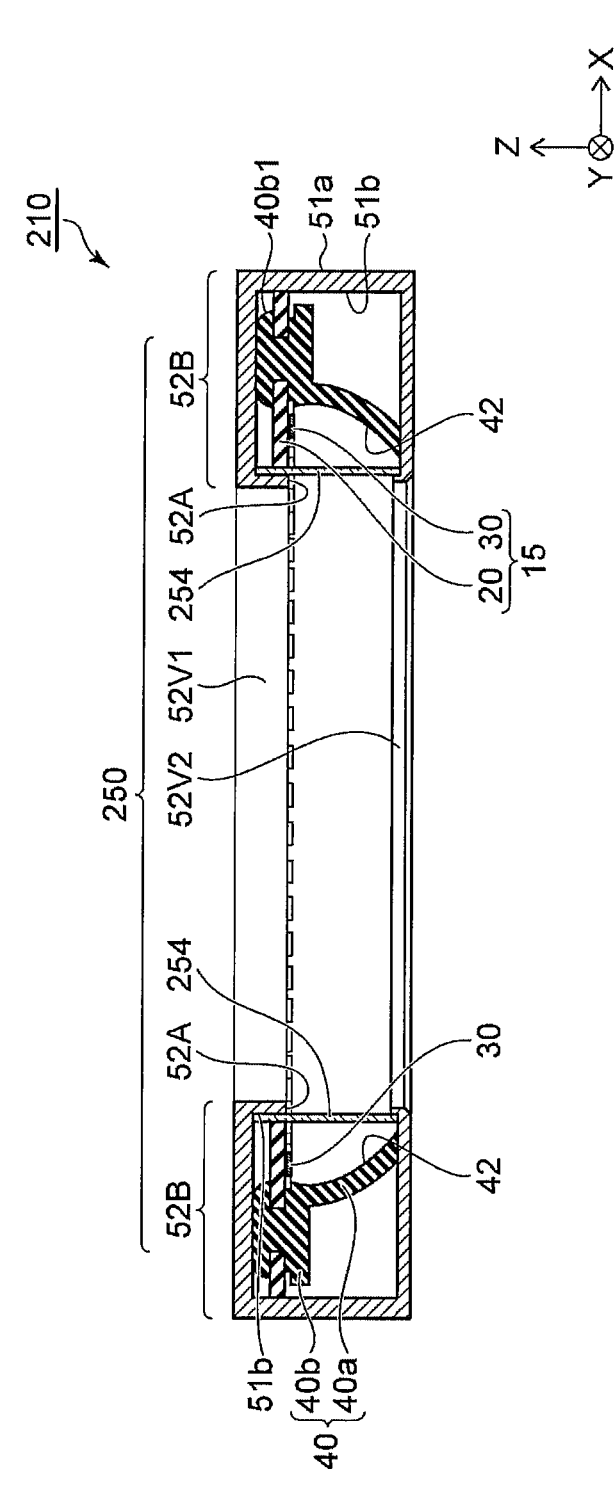
FIG. 14B is a schematic cross-sectional view illustrating the illumination device according to the second embodiment.

FIG. 14B is a schematic cross-sectional view illustrating the illumination device according to the second embodiment.

As illustrated in FIGS. 14A and 14B, an illumination device 210 according to the present embodiment is different from the illumination device 10 illustrated in FIG. 1 in that a housing 250 including a light-transmissive member 254 is provided. In other respects, the configuration of the illumination device 210 is the same as that of the illumination device 10 according to the first embodiment. The same components are denoted by the same reference characters, and detailed description thereof will be omitted as appropriate.

The housing 250 includes the light-transmissive member 254, the opening 52A, the housing portion 52B, the first observation port 52V1, and the second observation port 52V2. The housing 250 is a hollow annular member, and the opening 52A, the housing portion 52B, the first observation port 52V1, and the second observation port 52V2 are the same as those of the housing 50 illustrated in FIG. 1.

The light-transmissive member 254 covers the opening 52A. The plurality of lights emitted from the light source module 15 and reflected by the reflective surface 42 of the light reflective member 40 are emitted to the opening region WP via the light-transmissive member 254.

The light-transmissive member 254 is formed of a material having transmissivity, and for example, a transparent resin is used. The light-transmissive member 254 is provided to inhibit a foreign matter such as dust from entering through the opening 52A. The light-transmissive member 254 can be formed of a transparent resin or the like having sufficient transparency, or can be formed of a light-transmissive resin or the like in which a scattering filler is dispersed. When the light-transmissive resin in which the diffusion filler is dispersed is used as the light-transmissive member 254, the light emitted from the light-transmissive member 254 is diffused. Therefore, when the light reaches the irradiation target, the irradiation target can be irradiated with light with further reduced luminance. In this case, as described in relation to FIG. 7A, the light emitted from the light-transmissive member 254 is preferably suppressed to be diffused to such an extent that the light is condensed at the condensing point F1.

Effects of the illumination device 210 according to the present embodiment will be described.

The illumination device 210 according to the present embodiment has an effect similar to that of the illumination device 10 illustrated in FIG. 1 and the like. In addition, the following effects are achieved. That is, since the illumination device 210 includes the housing 250 in which the opening 52A is covered with the light-transmissive member 254, the inside of the illumination device 210 is closed from the surrounding environment of the illumination device 210. Therefore, entry of a foreign substance such as dust existing in the surrounding environment into the illumination device 210 can be inhibited, and the illumination device 210 with high reliability can be obtained.

In the case of the light-transmissive member 254 in which the diffusion filler is dispersed, it is possible to diffuse the light with which the irradiation target is irradiated while ensuring the light condensation at the condensing point, and thus it is possible to irradiate the irradiation target with the light with reduced luminance unevenness.

Third Embodiment

Figure 15A:
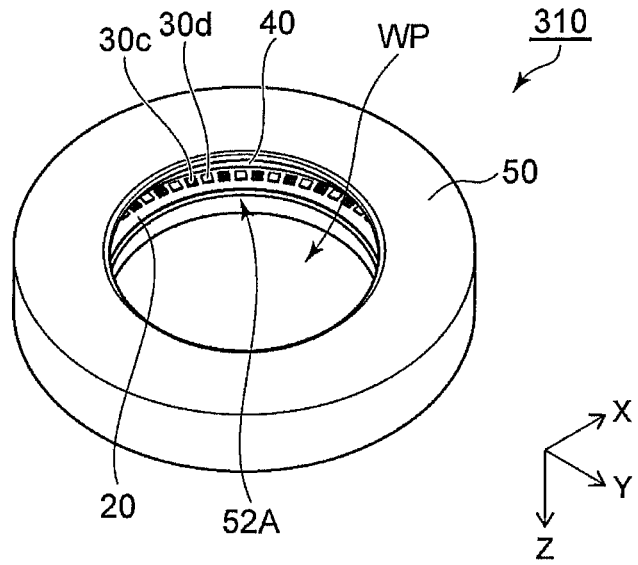
FIG. 15A is a schematic perspective view illustrating an illumination device according to a third embodiment.

FIG. 15A is a schematic perspective view illustrating an illumination device according to a third embodiment.

Figure 15B:
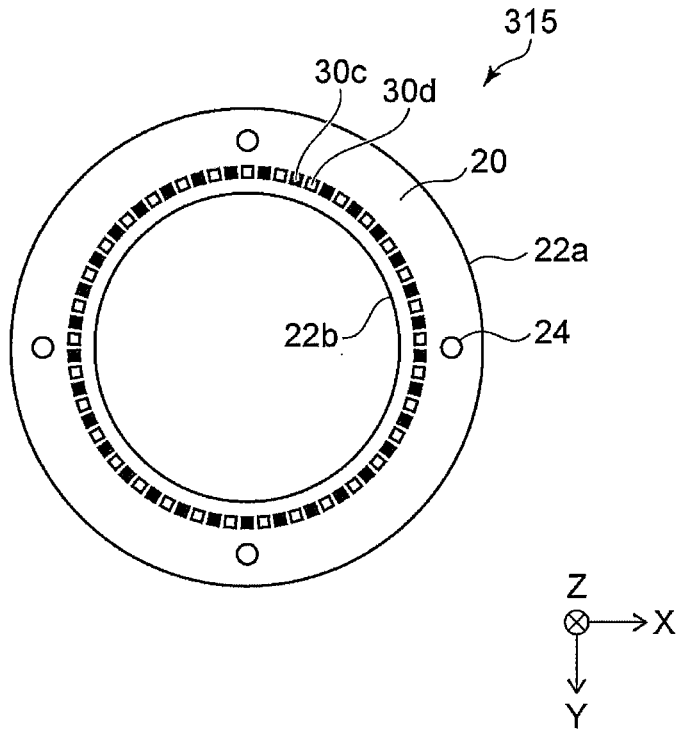
FIG. 15B is a schematic bottom view illustrating a light source module of the illumination device according to the third embodiment.

FIG. 15B is a schematic bottom view illustrating a light source module of the illumination device according to the third embodiment.

As illustrated in FIGS. 15A and 15B, an illumination device 310 according to the present embodiment includes a light source module 315 that is different from the light source module 15 of the illumination device 10 illustrated in FIG. 1. In other respects, the configuration of the illumination device 310 is the same as that of the illumination device 10 according to the first embodiment. The same components are denoted by the same reference characters, and detailed description thereof will be omitted as appropriate.

As illustrated in FIG. 15B, the light source module 315 includes the substrate 20 and light sources 30c and 30d. A plurality of the light sources 30c and a plurality of the light sources 30d are disposed on the substrate 20. The light sources 30c and 30d emit lights of different light emission colors. For example, the light sources 30c emit light of daylight color, and the light sources 30d emit light of light bulb color. By adjusting the luminance of the light emitted from each of the light sources 30c and 30d and mixing the colors of the lights emitted from the light sources 30c and 30d, it is possible to appropriately set the color tone of the light with which the irradiation target is irradiated. The light emission color of light emitted from each of the light sources 30c and 30d is not limited to the above-described color, and is appropriately selected according to an irradiation target, the color tone of environmental illumination in which the illumination device 310 is installed, or the like.

For example, the plurality of light sources 30c and the plurality of light sources 30d are alternately arranged annularly. The alternate arrangement means that the light source

30d is disposed next to the light source 30c, the light source 30c is further disposed next to the light source 30d, and all the light sources 30c and 30d are sequentially arranged in an annular shape. The arrangement order of the light sources 30c and 30d is not limited to the above, and is appropriately set according to the irradiation target, the color tone of the environmental illumination in which the illumination device 310 is installed, the shape of the arrangement in a plan view, or the like. In addition, the light sources 30c and 30d are not limited to the case of emitting lights at the same time, and for example, any one of the light sources 30c and 30d can be selected and caused to emit light according to an irradiation target or the like.

Effects of the illumination device 310 according to the present embodiment will be described.

The illumination device 310 according to the present embodiment has an effect similar to that of the illumination device 10 illustrated in FIG. 1 and the like. In addition, the following effects are achieved. That is, the illumination device 310 includes the light source module 315 in which the plurality of light sources 30c and 30d having different light emission colors are disposed in an annular shape on the substrate 20. By appropriately setting the light emission color of the light emitted from each of the light sources 30c and 30d, it is possible to achieve appropriate illumination according to the irradiation target, the color tone of the environmental illumination in which the illumination device 310 is installed, the shape of the arrangement in a plan view, or the like.

Fourth Embodiment

Figure 16A:
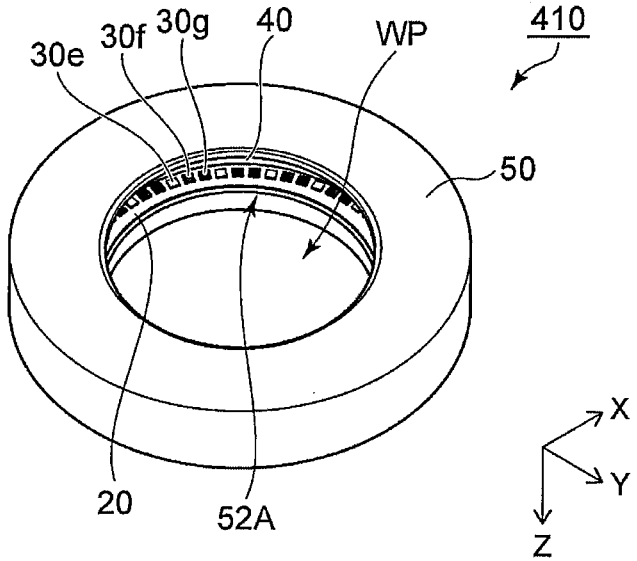
FIG. 16A is a schematic perspective view illustrating an illumination device according to a fourth embodiment.

FIG. 16A is a schematic perspective view illustrating an illumination device according to a fourth embodiment.

Figure 16B:
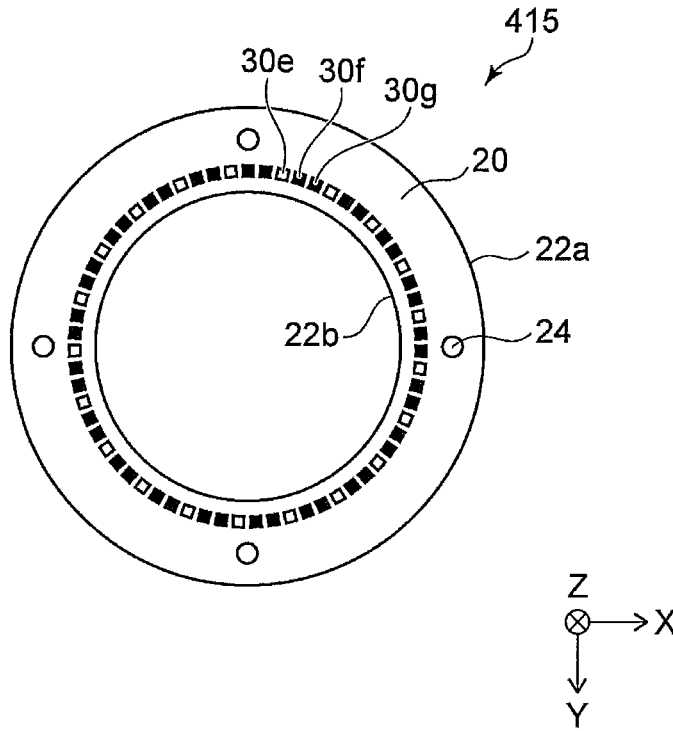
FIG. 16B is a schematic bottom view illustrating a light source module of the illumination device according to the fourth embodiment.

FIG. 16B is a schematic bottom view illustrating a light source module of the illumination device according to the fourth embodiment.

As illustrated in FIGS. 16A and 16B, an illumination device 410 according to the present embodiment includes a light source module 415 that is different from the light source module 15 of the illumination device 10 illustrated in FIG. 1. In other respects, the configuration of the illumination device 410 is the same as that of the illumination device 10 according to the first embodiment. The same components are denoted by the same reference characters, and detailed description thereof will be omitted as appropriate.

As illustrated in FIG. 16B, the light source module 415 includes the substrate 20 and light sources 30e, 30f, and 30g. A plurality of the light sources 30e, a plurality of the light sources 30f, and a plurality of the light sources 30g are disposed on the substrate 20. The light sources 30e, 30f, and 30g emit lights of mutually different light emission colors. For example, the light sources 30e emit red light, the light sources 30f emit green light, and the light sources 30g emit blue light.

For example, the light sources 30e, 30f, and 30g are annularly arranged in this order. That is, the light source 30e is disposed next to the light source 30d, the light source 30f is disposed next to the light source 30e, and the light source 30d is disposed next to the light source 30f. The arrangement order of the light sources 30d, 30e, and 30f is not limited to the above, and is appropriately selected according to the irradiation target, the color tone of the environmental illumination in which the illumination device 310 is installed, the shape of the arrangement in a plan view, or the like.

In the illumination device 410 according to the present embodiment, by adjusting the luminance of the light emitted from each of the light sources 30*e*, 30*f*, and 30*g* and mixing the colors of the lights emitted from the light sources 30*e*, 30*f*, and 30*g*, it is possible to appropriately set the color tone of the light with which the irradiation target is irradiated. The light emission color of light emitted from each of the light sources 30*e*, 30*f*, and 30*g* is not limited to the above-described color, and is appropriately selected according to an irradiation target, the color tone of environmental illumination in which the illumination device 310 is installed, or the like. Further, the light sources 30*e*, 30*f*, and 30*g* are not limited to the case of emitting lights at the same time, and any one or two of the light sources 30*e*, 30*f*, and 30*g* can be selected and caused to emit light according to an irradiation target or the like. Further, the luminance of each of the light sources 30*e*, 30*f*, and 30*g* can be dynamically adjusted to irradiate the irradiation target with light having a desired color tone according to the irradiation target or the like.

Effects of the illumination device 410 according to the present embodiment will be described.

The illumination device 410 according to the present embodiment has an effect similar to that of the illumination device 10 illustrated in FIG. 1 and the like. In addition, the following effects are achieved. That is, the illumination device 410 includes the light source module 415 in which the plurality of light sources 30*e*, 30*f*, and 30*g* having different light emission colors are disposed in an annular shape on the substrate 20. By appropriately setting the light emission color of the light emitted from each of the light sources 30*e*, 30*f*, and 30*g*, it is possible to achieve appropriate illumination according to the irradiation target, the color tone of the environmental illumination in which the illumination device 410 is installed, the shape of the arrangement in a plan view, or the like.

Fifth Embodiment

Figure 17A:
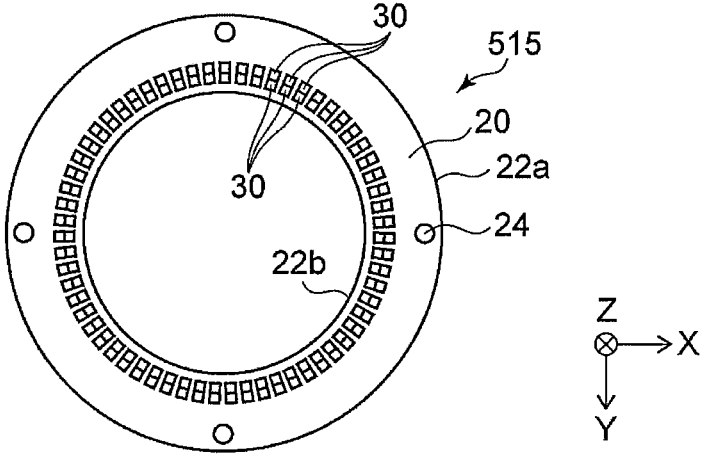
FIG. 17A is a schematic bottom view illustrating a light source module of an illumination device according to a fifth embodiment.

FIG. 17A is a schematic bottom view illustrating a light source module of an illumination device according to a fifth embodiment.

As illustrated in FIG. 17A, the illumination device according to the present embodiment includes a light source module 515 different from the light source module 15 of the illumination device 10 illustrated in FIG. 1. In other respects, the configuration of the illumination device is the same as that of the illumination device 10 according to the first embodiment. The same components are denoted by the same reference characters, and detailed description thereof will be omitted as appropriate.

The light source module 515 includes the substrate 20 and the plurality of light sources 30. The plurality of light sources 30 are disposed in an annular shape on the substrate 20 as in the case of the light source module 15 illustrated in FIGS. 3A and 3B. In the present embodiment, a part of the plurality of light sources 30 are disposed in an annular shape on the substrate 20, and the rest of the plurality of light sources 30 are disposed in an annular shape, surrounding the outside of the part of the light sources 30 disposed in an annular shape. That is, in the present embodiment, in the light source module 515, the plurality of light sources 30 are disposed in a double circular annular shape.

The annular arrangement of the plurality of light sources 30 is not limited to double, and can be triple, quadruple, or more.

Variations

Figure 17B:
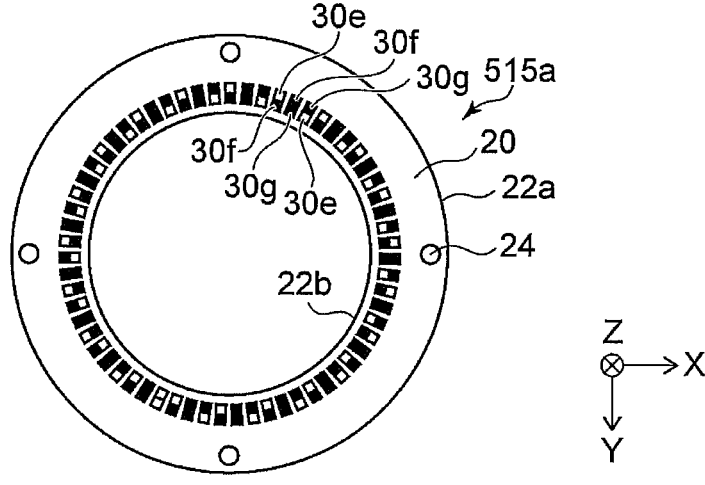
FIG. 17B is a schematic bottom view illustrating a light source module of an illumination device according to a variation of the fifth embodiment.

FIG. 17B is a schematic bottom view illustrating a light source module of an illumination device according to a variation of the fifth embodiment.

Figure 17C:
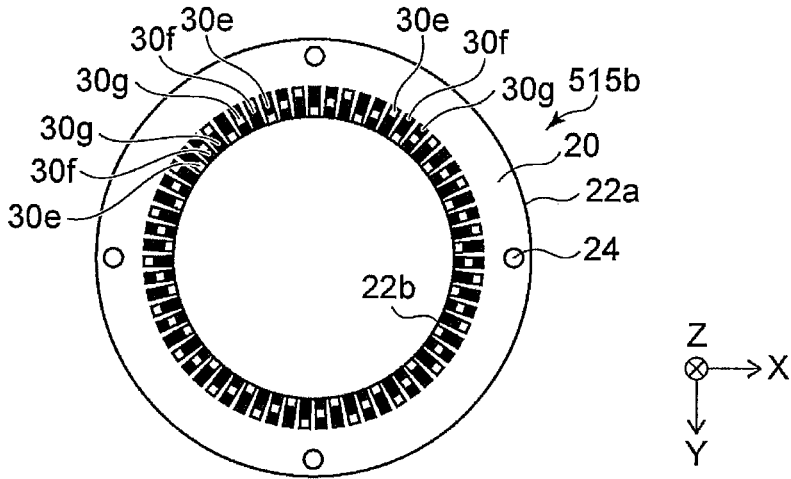
FIG. 17C is a schematic bottom view illustrating a light source module of an illumination device according to another variation of the fifth embodiment.

FIG. 17C is a schematic bottom view illustrating a light source module of an illumination device according to another variation of the fifth embodiment.

As illustrated in FIGS. 17B and 17C, in multiple annular arrangements of a plurality of light sources, light sources having different light emission colors can be provided.

In a light source module 515*a*, the light sources 30*e*, 30*f*, and 30*g* are disposed in an annular shape in this order, and the light sources 30*e*, 30*f*, and 30*g* are disposed in an annular shape on the outside thereof. In a light source module 515*b*, the light sources 30*e*, 30*f*, and 30*g* are disposed in an annular shape further outside the double annular shape of the light sources 30*e*, 30*f*, and 30*g*. That is, in the light source module 515*a*, the light sources 30*e*, 30*f*, and 30*g* are disposed in a double annular shape, and in the light source module 515*b*, the light sources 30*e*, 30*f*, and 30*g* are disposed in a triple annular shape. The color of light emitted from each of the light sources, the arrangement order of the light sources, the emission luminance of the light sources, and what light sources are selected and caused to emit light are appropriately selected in accordance with the irradiation target, the color tone of illumination or the like in the surrounding environment in which the illumination device is installed, and the like, as in the case of the light source module 415 described with reference to FIGS. 16A and 16B.

Effects of the illumination devices according to the present embodiment and the variations will be described.

The illumination devices according to the present embodiment and the variations have an effect similar to that of the illumination device 10 illustrated in FIG. 1 and the like. In addition, the following effects are achieved. That is, in each of the light source modules 515, 515*a*, and 515*b* included in the illumination device, a plurality of light sources are disposed in a multiple annular shape on the substrate 20. This makes it possible to dispose a larger number of light sources on the substrate 20. When the light sources are the light-emitting devices 30*a* having the surface mount type package illustrated in FIG. 4, the light source modules 515, 515*a*, and 515*b* have high heat dissipation through the substrate 20. By adopting a light source module in which a larger number of light sources are mounted, it is possible to obtain an illumination device that can irradiate an irradiation target with light having high luminance.

Sixth Embodiment

Figure 18A:
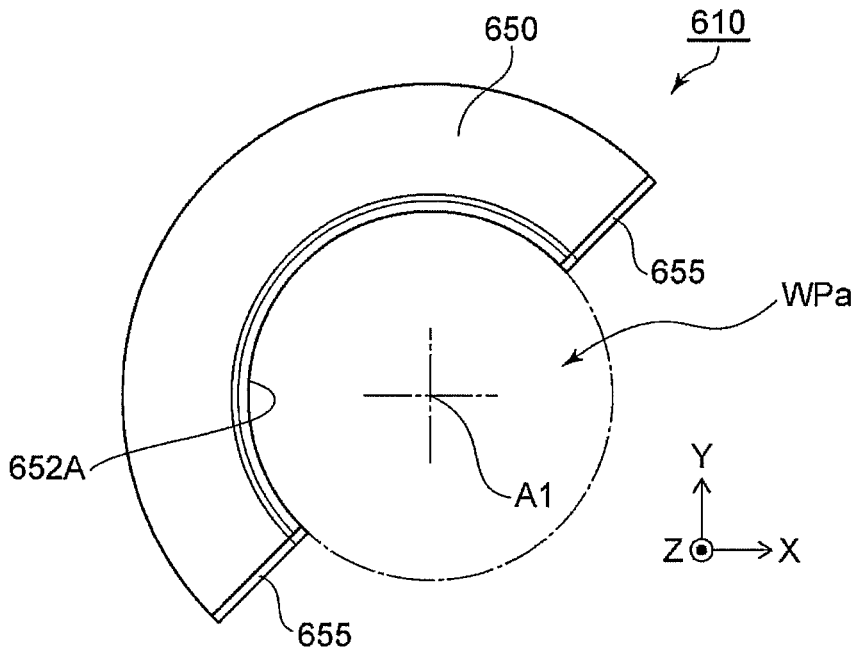
FIG. 18A is a schematic top view illustrating an illumination device according to a sixth embodiment.

FIG. 18A is a schematic top view illustrating an illumination device according to a sixth embodiment.

Figure 18B:
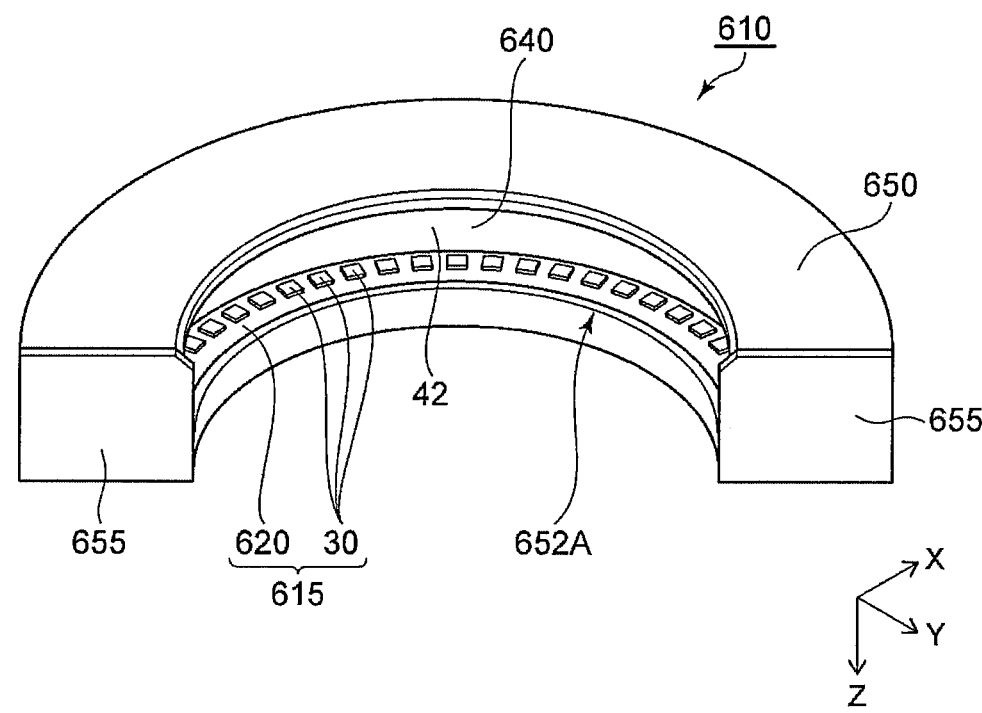
FIG. 18B is a schematic perspective view illustrating the illumination device according to the sixth embodiment.

FIG. 18B is a schematic perspective view illustrating the illumination device according to the sixth embodiment.

As illustrated in FIGS. 18A and 18B, an illumination device 610 according to the present embodiment is different from the illumination device 10 illustrated in FIG. 1 in that the illumination device 610 includes a light source module 615 including a substrate 620 having an arc shape and the plurality of light sources 30 disposed on the substrate 620. In addition, the illumination device 610 is different from the illumination device 10 in that a light reflective member 640 formed in an arc shape in a plan view is provided corresponding to the light source module 615. Further, the illumination device 610 is different from the illumination device 10 in that a housing 650 having an arc shape in a plan view is provided in order to house the light source module 615 and the light reflective member 640 having an arc shape. In other respects, the configuration of the illumination device 610 is the same as that of the illumination device 10 according to the first embodiment, and the same components are denoted by the same reference characters, and detailed description thereof will be omitted as appropriate.

In the light source module 615, the plurality of light sources 30 are disposed in an arc shape. The arc shape means a part of an annular shape. In the present example, the plurality of light sources 30 are disposed in a semicircular shape on the substrate 620 having a semicircular shape forming a part of a circular ring in a plan view. The light reflective member 640 is disposed surrounding the lateral side of the plurality of light sources 30 disposed in an arc shape and covering the plurality of light sources 30. The housing 650 houses the light source module 615 and the light reflective member 640. The housing 650 has an opening 652A inside the semicircular shape. The housing 650 is provided with end portion covers 655 at both end portions in the circumferential direction of the semicircle. The light source module 615 and the light reflective member 640 are closed from the external environment by the housing 650 and the end portion covers 655 at a portion other than the opening 652A.

As described above with reference to FIGS. 7A and 7B, the light emitted from each of the plurality of light sources 30 is reflected by the reflective surface 42 of the light reflective member 640, is condensed at the condensing point, and then travels toward the inside of the semicircle and downward. The light is emitted from the opening 652A to an opening region WPa. The opening region WPa is a region on an inner side of the housing 650 and a region including the opening 652A. In FIG. 18A, the two dot chain line represents the opening region WPa as a circle including the inside diameter of the housing 650 in a plan view. As described above with reference to FIG. 8, the central axis A1, along which the plurality of lights emitted from the plurality of light sources 30 are directed, extends through the center of the circle indicated by the two dot chain line. The irradiation target is disposed in the opening region WPa in the top view.

Variations

Figure 19A:
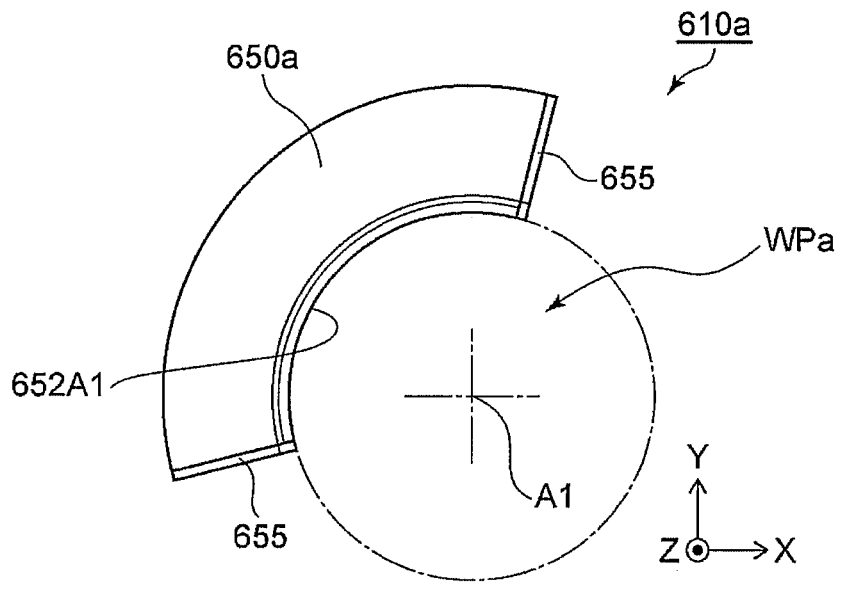
FIG. 19A is a schematic top view illustrating an illumination device according to a variation of the sixth embodiment.

FIG. 19A is a schematic top view illustrating an illumination device according to a variation of the sixth embodiment.

Figure 19B:
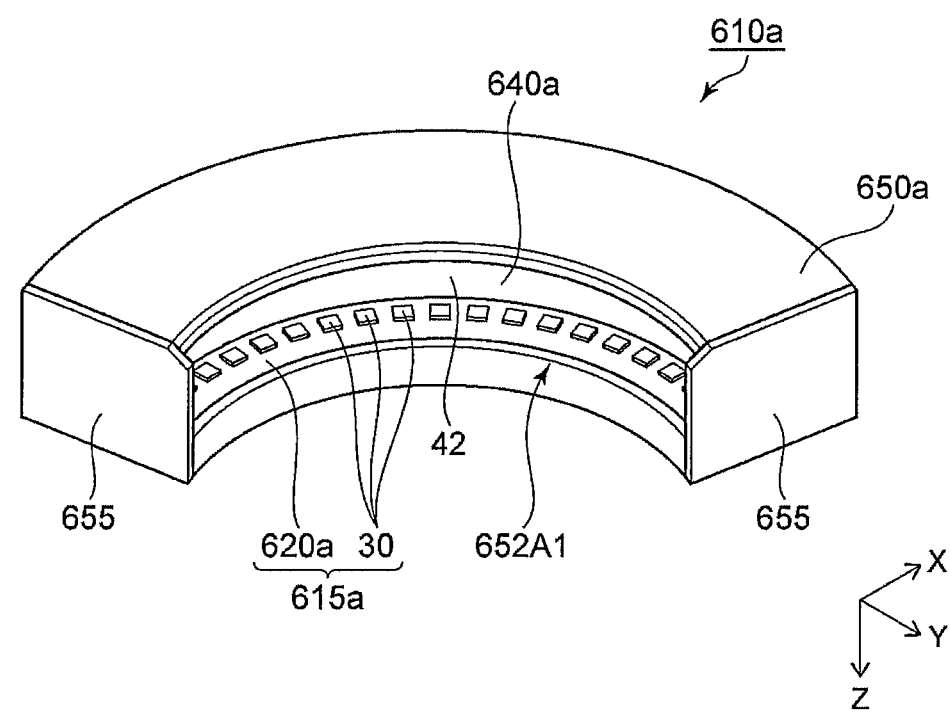
FIG. 19B is a schematic perspective view illustrating the illumination device according to the variation of the sixth embodiment.

FIG. 19B is a schematic perspective view illustrating the illumination device according to the variation of the sixth embodiment.

As illustrated in FIGS. 19A and 19B, an illumination device 610a can have a ⅓ circular shape in a plan view.

In a light source module 615a, the plurality of light sources 30 are disposed in a ⅓ circular shape on a substrate 620a having a ⅓ circular shape forming a part of a circular ring in a plan view. A light reflective member 640a is formed in a ⅓ circular shape in a plan view, and is provided covering the plurality of light sources 30. In a plan view, a housing 650a having a ⅓ circular shape houses the light source module 615a and the light reflective member 640a therein.

The housing 650a has an opening 652A1 on the inner edge side of the ⅓ circular shape. As described above with reference to FIGS. 7A and 7B, the light emitted from each of the plurality of light sources 30 is reflected by the reflective surface 42 of the light reflective member 640a, is condensed at the condensing point, and then travels toward the inner edge side of the ⅓ circle and downward.

The light is emitted from the opening 652A1 to the opening region WPa. The opening region WPa is a region including the opening 650a on an inner side of the housing 652A1, and in FIG. 19A, the two dot chain line represents a circle including the inside diameter of the housing 650a.

The central axis A1, along which the plurality of lights emitted from the plurality of light sources 30 are directed, extends through the center of the circle indicated by the two dot chain line. The irradiation target is disposed in the opening region WPa.

Effects of the illumination devices 610, 610a according to the present embodiment and the variation will be described.

In the illumination devices 610, 610a according to the present embodiment and the variation, the plurality of light sources 30 are disposed in an arc shape, and the light reflective members 640, 640a are also formed in an arc shape and cover the plurality of light sources 30. Therefore, the plurality of lights emitted from the plurality of light sources 30 travel toward the inside of the arc shape. The irradiation target is placed on the inner side of the arc and below the illumination device 610, 610a. Thus, the irradiation target is illuminated from one direction obliquely upward. In a case in which it is difficult to determine the state of the unevenness of the surface of the irradiation target when the irradiation target is irradiated from all directions, it is possible to observe a more detailed surface state of the irradiation target by irradiating the irradiation target with light from some directions.

In the above-described specific example, the illumination device 610 has a semicircular shape or a ⅓ circular shape in a plan view, but is not limited thereto, and can have an arbitrary arc shape such as a ¼ circular shape in accordance with the shape, the surface state, or the like of the irradiation target.

Seventh Embodiment

Figure 20A:
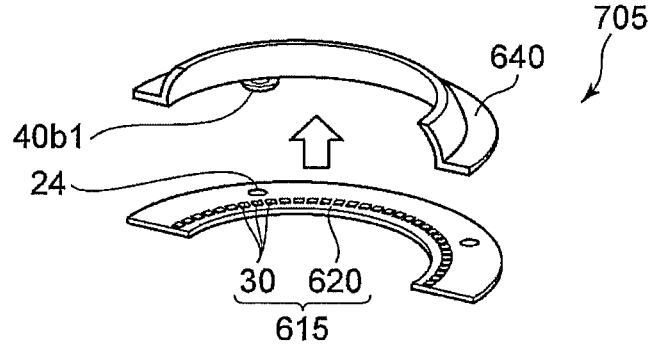
FIG. 20A is a schematic exploded view illustrating a method for manufacturing an illumination device according to a seventh embodiment.
Figure 20B:
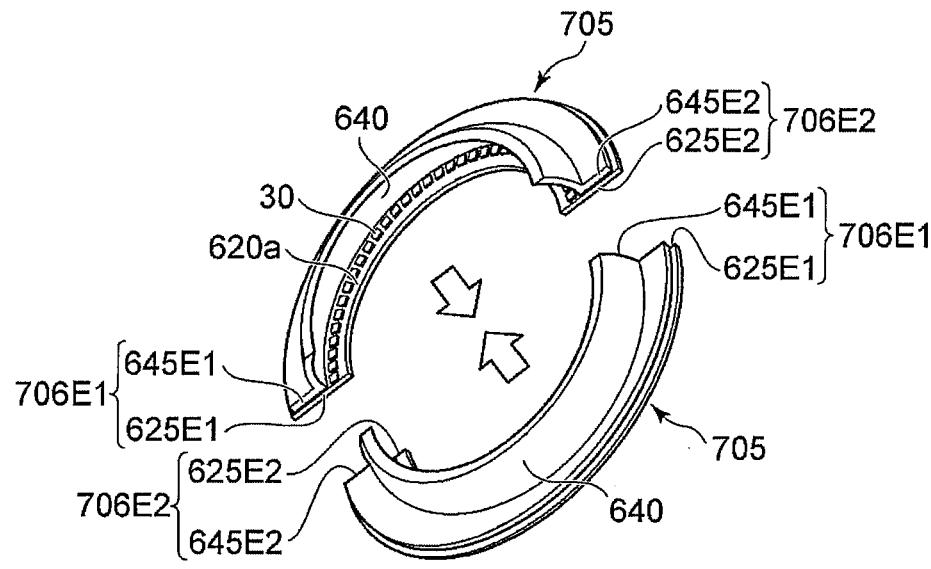
FIG. 20B is a schematic exploded view illustrating the method for manufacturing the illumination device according to the seventh embodiment.
Figure 20C:
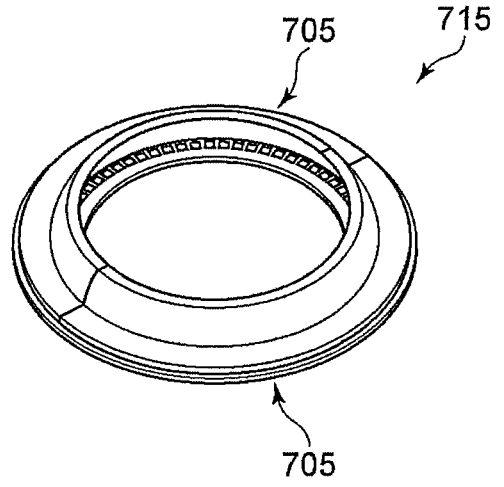
FIG. 20C is a schematic perspective completion view illustrating the method for manufacturing the illumination device according to the seventh embodiment.

FIGS. 20A to 20C are schematic exploded views illustrating a method for manufacturing an illumination device according to a seventh embodiment.

In the present embodiment, the method for manufacturing the illumination device formed in an annular shape using the light source module 615 and the light reflective member 640 formed in an arc shape described in relation to FIGS. 18A and 18B will be described.

As illustrated in FIG. 20A, the light source module 615 and the light reflective member 640 are prepared. The prepared light source module 615 is coupled to the light reflective member 640. In the coupling of the light source module 615 and the light reflective member 640, the fitting projected portions 40b1 of the light reflective member 640 are inserted into the fitting hole portions 24 provided in the substrate 620, and after the insertion, the tips of the fitting projected portions 40b1 are increased in diameter by heat treatment and fixed.

As illustrated in FIG. 20B, an intermediate member 705 formed by coupling the light source module 615 and the light reflective member 640 is prepared. Two intermediate members 705 are prepared. The intermediate member 705 includes end portions 706E1 and 706E2 at both ends. The end portion 706E1 is composed of an end portion 625E1 of the substrate 620 and an end portion 645E1 of the light reflective member 640. The end portion 706E2 is composed of an end portion 625E2 of the substrate 620 and an end portion 645E2 of the light reflective member 640. The end portions 625E1 and 625E2 of the substrate 620 and the end portions 645E1 and 645E2 of the light reflective member 640 are each end portions of the arc.

The two prepared intermediate members 705 are coupled together. In the coupling of the intermediate members 705, as indicated by the two arrows in FIG. 20B, the end portions of the two intermediate members 705 are opposed to each other and coupled. To be more specific, in the coupling of the end portions, the end portion 706E1 of one intermediate member 705 and the end portion 706E2 of the other intermediate member 705 are opposed and joined, and the end portion 706E2 of one intermediate member 705 and the end portion 706E1 of the other intermediate member 705 are opposed and joined. In the joining of the end portions 706E1 and 706E2, for example, the end portions 625E1 and 625E2 of the substrate 620 are joined facing each other, and the end portions 645E1 and 645E2 of the light reflective member 640 are joined facing each other. For example, an adhesive can be used for the joining.

As illustrated in 20C, two intermediate members 705 can be coupled to form an illumination portion 715. The illumination portion 715 can be housed in, for example, the housing 50 illustrated in FIG. 1 to form the illumination device 10.

The intermediate member 705 described above in relation to FIG. 20A is housed in the housing 650 illustrated in FIG. 18A, and the end portion of the housing 650 is covered with the end portion covers 655, whereby the illumination device 610 according to the sixth embodiment can be obtained.

In the present embodiment described above, the illumination device 10 illustrated in FIG. 1 can be formed by combining and coupling three intermediate members, for example, as the light source module 615a and the light reflective member 40 having a ⅓ circular shape illustrated in FIGS. 19A and 19B as the intermediate members. Further, the intermediate members are not limited to a semicircular shape or a ⅓ circular shape, and can be a ¼ circular shape or the like.

Effects of the method for manufacturing the illumination device according to the present embodiment will be described.

In the method for manufacturing the illumination device according to the present embodiment, the intermediate members are each formed by coupling the light source module and the light reflective member formed in an arc shape, and the illumination device is formed by combining and coupling the intermediate members. By setting the arc length of the arc shape of the light source module and the light reflective member to 1/n (n is an integer) of the ring length of the annular shape of the illumination device, the illumination device can be formed by combining the intermediate members having the same shape. Further, by housing the light source module and the light reflective member formed in an arc shape in a housing having an arc shape, the illumination device 610, 610a, or the like having an arc shape can be obtained, and the intermediate members can be shared by a plurality of types of the illumination devices 10, 610, and 610a. Therefore, the members can be used in common, the manufacturing period can be shortened, and the management cost, the manufacturing cost, and the like can be reduced.

Eighth Embodiment

Figure 21:
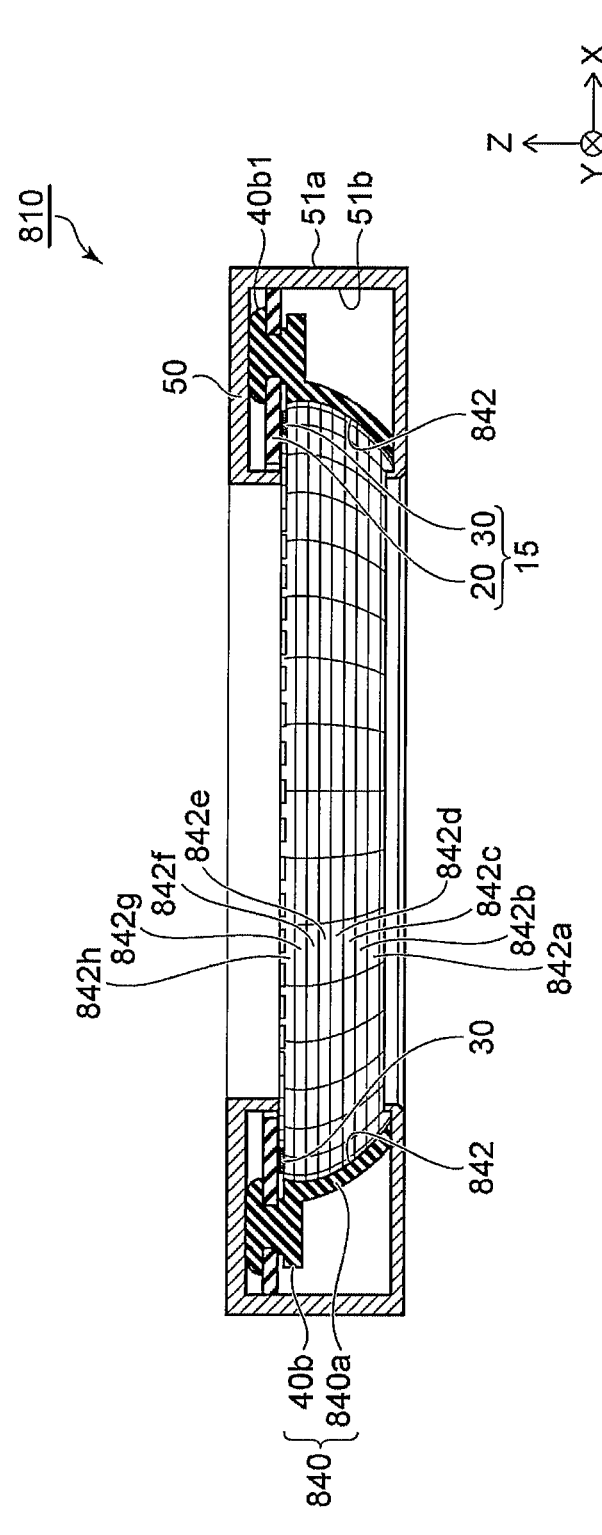
FIG. 21 is a schematic cross-sectional view of an illumination device according to an eighth embodiment.

FIG. 21 is a schematic cross-sectional view of an illumination device according to an eighth embodiment.

The reflective surface of the light reflective member does not have to be a curved surface as long as light emitted from each of the plurality of light sources 30 and having high luminance can pass through the condensing point and reach a position farther than the position where the light having low luminance reaches. In an illumination device 810 according to the present embodiment, a reflective surface 842 of a light reflective member 840 includes a plurality of reflective surfaces 842a to 842h, and all of the reflective surfaces 842a to 842h are flat reflective surfaces.

As illustrated in FIG. 21, the illumination device 810 according to the present embodiment is different from the illumination device 10 illustrated in FIG. 1 in that the light reflective member 840 is provided. In other respects, the configuration of the illumination device 810 is the same as that of the illumination device 10 according to the first embodiment, and the same components are denoted by the same reference characters, and detailed description thereof will be omitted as appropriate. The light reflective member 840 is formed of a material such as a resin or a metal, similarly to the light reflective member 40 in the case of the illumination device 10 illustrated in FIG. 1.

The light reflective member 840 includes a reflecting portion 840a and a support portion 40b. The reflecting portion 840a has the reflective surface 842. The reflective surface 842 includes the plurality of reflective surfaces 842a to 842h. The plurality of reflective surfaces 842a to 842h are all flat reflective surfaces. The plurality of reflective surfaces 842a to 842h are disposed such that they reflect light emitted from the light sources 30 and condense the reflected light at the condensing point.

The reflective surfaces 842a to 842h are arranged in this order from the negative direction side to the positive direction side of the Z axis. That is, the reflective surface 842h is located closer to the substrate 20 than the reflective surface 842a is. The angles of the reflective surfaces 842a to 842h from the Z axis are smaller in this order. That is, the angle of the reflective surface 842h from the Z axis is smaller than the angle of the reflective surface 842a from the Z axis.

As in the case of the illumination device 10 illustrated in FIGS. 7A and 7B, light having the highest luminance and traveling mainly in the Z axis direction out of the light emitted from the light sources 30 is reflected by the reflective surfaces (first reflective surfaces) 842a to 842d. The light having low luminance is reflected by the reflective surfaces (second reflective surfaces) 842e to 842h.

Since the angle of each of the reflective surfaces 842a to 842d from the Z axis is larger than the angle of each of the reflective surfaces 842e to 842h from the Z axis, after passing through the condensing point F1, the light having high luminance reflected by the reflective surfaces 842a to 842d reaches a position farther than the position where the light having low luminance reflected by the reflective surfaces 842e to 842h reaches. Therefore, as in the case of the illumination device 10 illustrated in FIG. 1 and the like, in the irradiation target, the luminance of the light having high luminance which has reached a farther position is weakened and becomes substantially the same as the luminance of the light having low luminance which has reached a closer position, and the irradiation target is irradiated with the light having reduced luminance unevenness.

Effects of the illumination device 810 according to the present embodiment will be described.

In the illumination device 810 according to the present embodiment, the reflective surface 842 is formed of the plurality of flat reflective surfaces 842a to 842h, and light having the highest luminance is reflected by the reflective surfaces 842a to 842d at positions farther from the substrate 20 than the positions where the reflective surfaces 842e to 842h are located. The angles of the reflective surfaces 842a to 842d from the Z axis are set such that light is condensed when the light is reflected, and the angles are set such that the light reaches a position farther than the position where the lights Lb and Lc reflected by the reflective surfaces 842e to 842h reach. Therefore, the light having the highest luminance reaches farther after passing through the condensing point. The light having low luminance is reflected by the reflective surfaces 842e to 842h and condensed, and then reaches a closer position. Therefore, the illumination device 810 can irradiate the irradiation target with the light having further reduced luminance unevenness.

Ninth Embodiment

Figure 22:
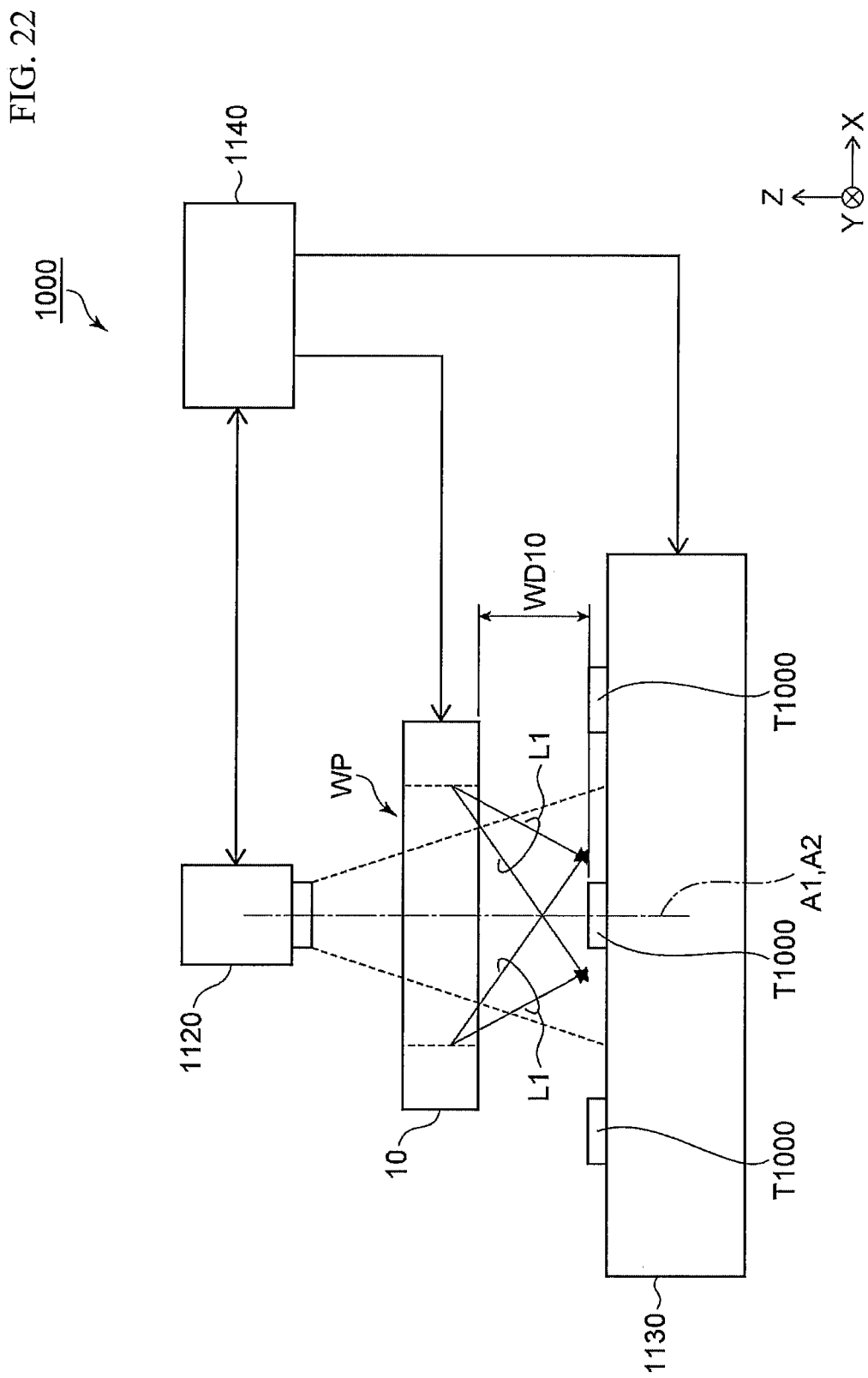
FIG. 22 is a schematic block diagram illustrating an inspection device according to a ninth embodiment.

FIG. 22 is a schematic block diagram illustrating an inspection device according to a ninth embodiment.

As illustrated in FIG. 22, an inspection device 1000 according to the present embodiment includes the illumination device 10 and an imaging device 1120. The illumination device 10 is the illumination device according to the first embodiment illustrated in FIG. 1. The inspection device 1000 further includes a control device 1140.

The illumination device 10 is disposed above an inspection table 1130. An inspection target T1000 is placed on the inspection table 1130. The illumination device 10 is disposed at a distance WD10 from the surface of the inspection target T1000. The imaging device 1120 is disposed above the illumination device 10. The illumination device 10 emits a plurality of lights L1 toward the inspection target T1000 to irradiate the inspection target T1000. The imaging device 1120 images the illuminated inspection target T1000 via the opening region WP of the illumination device 10.

For example, the imaging device 1120 is disposed such that an optical axis A2 of the lens of the imaging device 1120 coincides with the central axis A1 of illumination device 10. The inspection target T1000 is disposed such that the center position of the inspection target T1000 substantially coincides with the central axis A1 and the optical axis A2.

The control device 1140 is electrically connected to the illumination device 10, the imaging device 1120, and the inspection table 1130. The control device 1140 supplies power to the illumination device 10 so that the illumination device 10 is turned on and emits the plurality of lights L1. The control device 1140 transmits an imaging command to the imaging device 1120 such that the imaging device 1120 images the inspection target T1000. The imaging device 1120 captures an image of the inspection target T1000 in response to the imaging command. The imaging device 1120 transmits image data including the captured image of the inspection target T1000 to the control device 1140.

The control device 1140 has, for example, an image processing function and an image recognition function. The image processing function and the image recognition function of the control device 1140 are to perform inspection of the inspection target T1000 based on the image data acquired by the imaging device 1120, and execute, for example, quality determination of the inspection result.

The control device 1140 can determine the quality of the image data obtained by the imaging device 1120. For example, the control device 1140 can adjust the luminance of the lights L1 of the illumination device 10 on the basis of the quality determination result, set an optimal illumination condition, and then acquire image data for inspection determination.

The control device 1140 can drive and control the inspection table 1130 movable in the X axis direction. As in the example of FIG. 22, a plurality of the inspection targets T1000 are placed at equal intervals along the X axis direction on the inspection table 1130. The inspection table 1130 is moved in the X axis direction by, for example, the control device 1140. By setting the moving distances to the placement intervals of the inspection targets T1000, the inspection device 1000 can sequentially inspect the plurality of inspection targets T1000.
First Variation
FIG. 23 is a schematic block diagram illustrating an inspection device according to a variation of the ninth embodiment.

Figure 23:
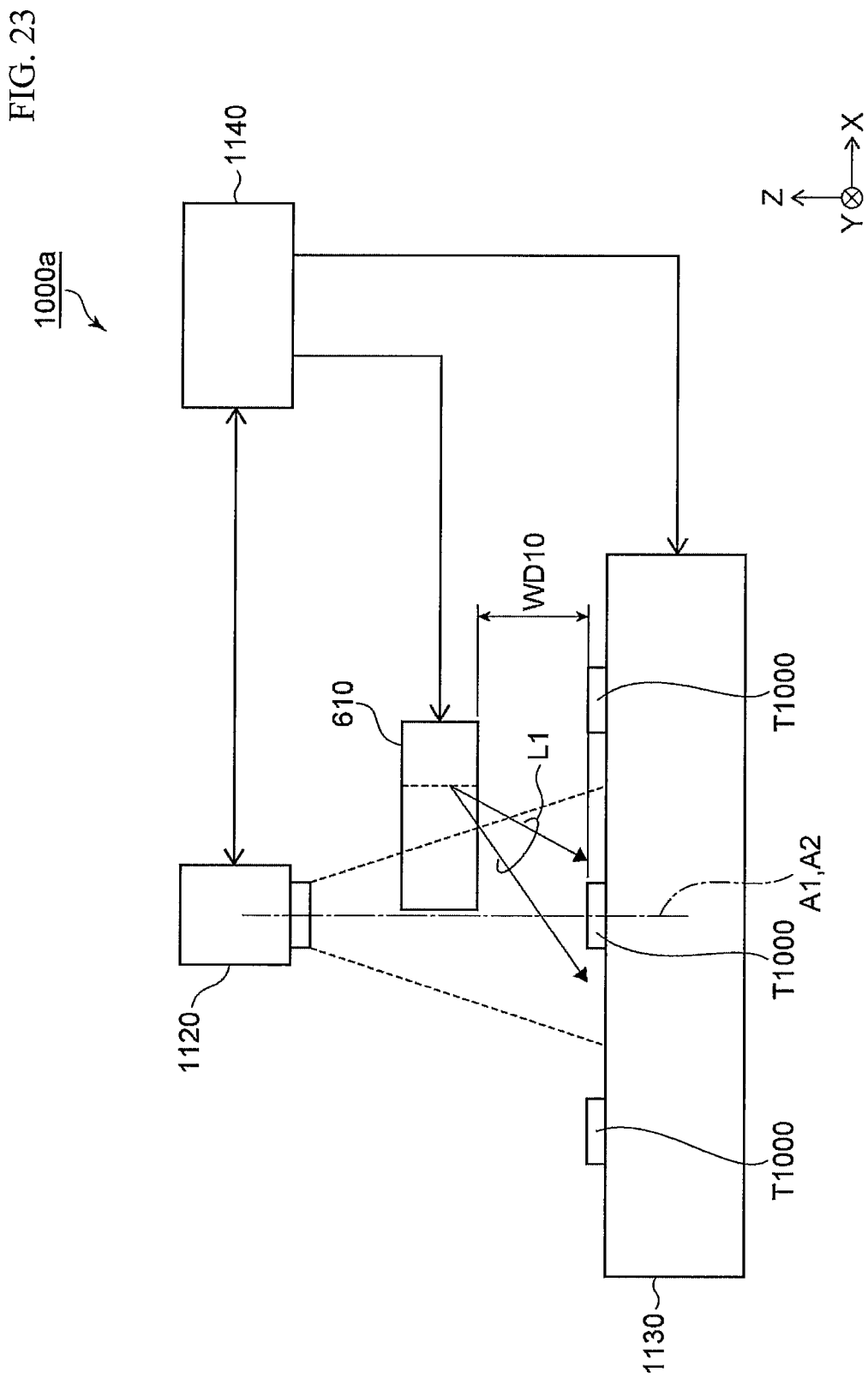
FIG. 23 is a schematic block diagram illustrating an inspection device according to a variation of the ninth embodiment.

As illustrated in FIG. 23, an inspection device 1000a according to the present embodiment is different from the inspection device 1000 illustrated in FIG. 22 in that the illumination device 610 is provided. The inspection device 1000a is the same as the inspection device 1000 according to the ninth embodiment in other respects, and the same components are denoted by the same reference characters and detailed description thereof will be omitted as appropriate.

The illumination device 610 is disposed above the inspection target T1000 at a distance WD10 from the surface of the inspection target T1000. The imaging device 1120 is disposed above the illumination device 610. For example, the imaging device 1120 is disposed such that an optical axis A2 of the lens of the imaging device 1120 coincides with the central axis A1 of the illumination device 610. The inspection target T1000 is placed on the inspection table 1130 such that the center position of the inspection target T1000 substantially coincides with the central axis A1 and the optical axis A2.

In the present variation, the illumination device 610 having a semicircular shape is provided, and the illumination device 610 emits the plurality of lights L1 toward the inspection target T1000 from one direction obliquely above the inspection target T1000. Therefore, it is possible to effectively perform irradiation in accordance with the shape of the inspection target T1000. In addition, the control device 1140 can cause the illumination device 610 to rotationally move around the central axis A1. In this manner, it is possible to acquire the image data of the inspection target T1000 according to the direction of illumination.
Second Variation
FIG. 24 is a schematic cross-sectional view illustrating a portion of an inspection device according to another variation of the ninth embodiment.

Figure 24:
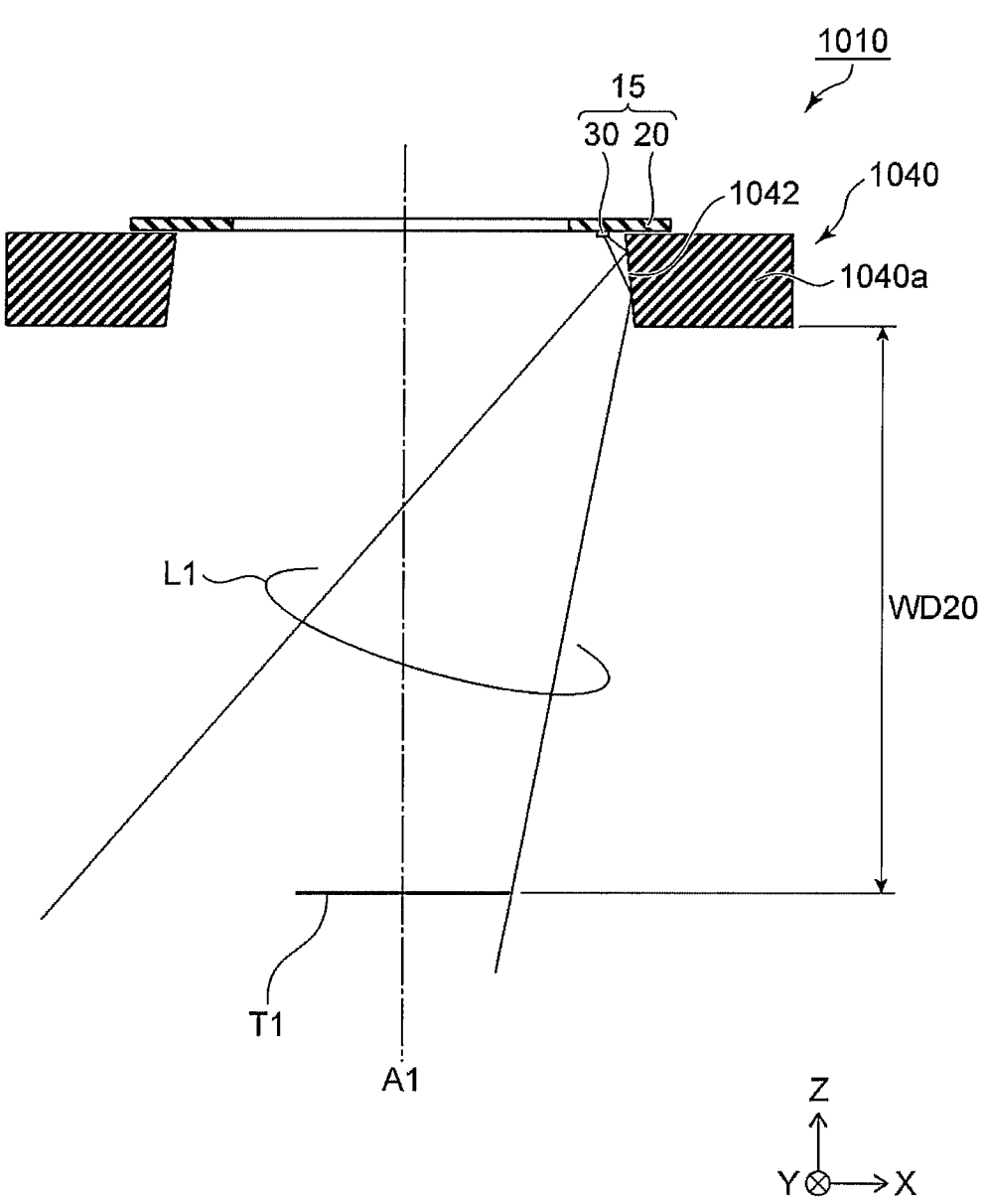
FIG. 24 is a schematic cross-sectional view illustrating a portion of an inspection device according to another variation of the ninth embodiment.

As illustrated in FIG. 24, the inspection device according to the present variation is different from the inspection device 1000 illustrated in FIG. 22 in that an illumination device 1010 includes a light reflective member 1040 different from the light reflective member illustrated in FIG. 1. The inspection device of the present variation is the same as the inspection device 1000 according to the ninth embodiment in other respects, and the same components are denoted by the same reference characters and detailed description thereof will be omitted as appropriate.

In the illumination device 1010 of the inspection device of the present variation, the light reflective member 1040 has a reflective surface 1042 on a reflecting portion 1040a. The reflective surface 1042 is a reflective surface which is a straight line in a cross-sectional view in a plane parallel to the XZ plane. In the present variation, a distance WD20 between the surface of the inspection target T1000 and the illumination device 1010 is sufficiently greater than, for example, the distance WD1 illustrated in FIGS. 7A and 7B. In such a case, it is possible to sufficiently increase the curvature of the curved surface of the reflective surface 1042 without forming a condensing point in the vicinity of the reflective surface 1042. Even if the reflective surface 1042 is substantially flat, when the lights L1 reach the inspection target T1000, the light with reduced luminance unevenness is emitted regardless of the direction of the light in the light sources 30.

Effects of the inspection device 1000, 1000*a* according to the present embodiment and the first variation will be described.

Since the inspection device 1000 includes the illumination device 10, the inspection device 1000 has the effects of the illumination device 10 according to the first embodiment, and also has the following effects. That is, in the illumination device 10, the emission directions of the plurality of lights L1 are appropriately set according to the distance WD10 between the illumination device 10 and the inspection target T1000. Therefore, it is possible to perform irradiation such that the state of the surface of the inspection target T1000 is appropriately represented, and it is possible to acquire more appropriate image data for inspection determination of the inspection target T1000.

As described above in relation to FIGS. 7A and 7B, an appropriate reflective surface can be designed according to the distance between the illumination device and the inspection target T1000, and the illumination device 10 including the light reflective member having an appropriate reflective surface can be easily obtained. By applying the inspection device 1000, the illumination device 10 is designed in accordance with the distance between the illumination device and the inspection target T1000, and thus appropriate image data for inspection determination can be acquired.

In addition, in a case in which the distance between the illumination device and the inspection target T1000 is sufficiently large, the illumination device 1010 can be applied to the inspection device according to the second variation. In the illumination device 1010, since the configuration of the light reflective member 1040 is simpler, there is an advantage in that manufacturing is easier.

Also in the inspection device 1000*a* according to the variation, by applying the illumination device 610, it is possible to easily acquire the image data of the surface state or the like of the inspection target T1000 according to the illumination direction.

According to the embodiments described above, it is possible to obtain an illumination device and an inspection device that irradiate an irradiation target with light having further reduced luminance unevenness.

While several embodiments of the present invention have been described above, these embodiments have been presented by way of example and are not intended to limit the scope of the invention. These novel embodiments may be implemented in various other forms and various omissions, substitutions, and changes may be made without departing from the spirit of the invention. These embodiments and variations thereof are included in the scope and spirit of the invention and are within the scope of the invention described in the claims and equivalents thereof. The aforementioned embodiments can be implemented in combination with each other.

The invention claimed is:

1. An illumination device comprising:
   a light source module comprising a substrate having a first surface and a plurality of light sources arranged on the first surface, each of the plurality of light sources being configured to emit light comprising first light and second light having luminance lower than luminance of the first light; and
   a light reflective member having a reflective surface configured to reflect the light emitted from each of the plurality of light sources, the reflective surface being disposed on a first surface side of the substrate, wherein
   the reflective surface comprises a first reflective surface configured to reflect the first light and a second reflective surface configured to reflect the second light,
   the second reflective surface is located closer to the substrate than the first reflective surface is, and
   of the light emitted from one light source of the plurality of light sources, the first light reflected by the first reflective surface and the second light reflected by the second reflective surface are condensed at a condensing point located on the first surface side of the substrate.

2. The illumination device according to claim 1, wherein the light emitted from each of the plurality of light sources has a Lambertian light distribution.

3. The illumination device according to claim 1, wherein the first reflective surface is configured to reflect the first light emitted from the plurality of light sources,
   the second reflective surface is configured to reflect the second light emitted from the plurality of light sources, and
   the first light emitted from the plurality of light sources is condensed with the second light emitted from the plurality of light sources at a plurality of the condensing points, respectively.

4. The illumination device according to claim 1, wherein the substrate comprises an opening region,
   the plurality of light sources are disposed in an annular shape around the opening region,
   the light emitted from each of the plurality of light sources is reflected by the reflective surface and travels toward an irradiation target, and
   a central axis of the opening region orthogonal to the first surface overlaps with the irradiation target in a plan view.

5. The illumination device according to claim 4, wherein a part of the plurality of light sources is disposed on an outer side of a remainder of the plurality of light sources.

6. The illumination device according to claim 4, wherein the condensing point is located between the reflective surface and the irradiation target.

7. The illumination device according to claim 1, wherein the plurality of light sources is disposed in an arc shape, and
   the light emitted from each of the plurality of light sources is reflected by the reflective surface and travels toward an irradiation target.

8. The illumination device according to claim 1, wherein the first reflective surface is a curved surface continuous with the second reflective surface, and
   a conic constant, k, of an aspheric polynomial of the curved surface satisfies a relationship of $-1 < k < 0$.

9. The illumination device according to claim 1, wherein the first reflective surface comprises a first plurality of reflection planes having mutually different angles, and
   the second reflective surface comprises a second plurality of reflection planes having mutually different angles.

10. The illumination device according to claim 1, wherein each of the plurality of light sources is a surface mount light-emitting device comprising a light-emitting element.

11. The illumination device according to claim 1, further comprising a housing that houses the light source module and the light reflective member, the housing is provided with an opening through which the light reflected by the reflective surface is emitted, the housing has an outer surface that is a light absorbing surface.

12. The illumination device according to claim 11, wherein the housing comprises a light-transmissive member covering the opening.

13. The illumination device according to claim 1, wherein the plurality of light sources have different light emission colors.

14. An illumination device comprising:

a plurality of intermediate members each comprising a light source module comprising a substrate having a first surface, and a plurality of light sources configured to emit, on the first surface, light comprising first light and second light having luminance lower than luminance of the first light; and a light reflective member having a reflective surface configured to reflect light emitted from each of the plurality of light sources, wherein in each of the plurality of intermediate members, the reflective surface comprises a first reflective surface configured to reflect the first light and a second reflective surface configured to reflect the second light, the second reflective surface is located closer to the substrate than the first reflective surface is, of the light emitted from one light source of the plurality of light sources, the first light reflected by the first reflective surface and the second light reflected by the second reflective surface are condensed at a condensing point, the plurality of light sources are disposed in an arc shape, and the light emitted from the plurality of light sources is reflected by the reflective surface and travel towards an irradiation target, and the plurality of intermediate members are connected to each other.

15. An inspection device comprising:

an illumination device; and an imaging device disposed apart from the illumination device and configured to image an inspection target irradiated with light emitted from the illumination device, wherein the illumination device comprises a light source module comprising a substrate having a first surface and a plurality of light sources arranged on the first surface, each of the plurality of light sources being configured to emit light comprising first light and second light having luminance lower than luminance of the first light; and a light reflective member configured to reflect the light emitted from each of the plurality of light sources, the reflective surface comprises a first reflective surface configured to reflect the first light and a second reflective surface configured to reflect the second light, and the second reflective surface is located closer to the substrate than the first reflective surface is.

16. The inspection device according to claim 15, wherein in the illumination device, of the light emitted from one light source of the plurality of light sources, the first light reflected by the first reflective surface and the second light reflected by the second reflective surface are condensed at a condensing point.

17. The inspection device according to claim 15, wherein the first reflective surface is configured to reflect the first light emitted from the plurality of light sources, the second reflective surface is configured to reflect the second light emitted from the plurality of light sources, and the first light emitted from the plurality of light sources is condensed with the second light emitted from the plurality of light sources at a plurality of the condensing points, respectively.

18. The inspection device according to claim 15, wherein the substrate comprises an opening region, the plurality of light sources are disposed in an annular shape around the opening region, the light emitted from each of the plurality of light sources is reflected by the reflective surface and travels toward an irradiation target, and a central axis of the opening region orthogonal to the first surface overlaps with the irradiation target in a plan view.

19. The inspection device according to claim 15, wherein the plurality of light sources is disposed in an arc shape, and the light emitted from each of the plurality of light sources is reflected by the reflective surface and travels toward an irradiation target.

20. The inspection device according to claim 15, wherein each of the plurality of light sources is a surface mount light-emitting device comprising a light-emitting element.

* * * * *